US010673232B2

(12) United States Patent
Zhao et al.

(10) Patent No.: US 10,673,232 B2
(45) Date of Patent: Jun. 2, 2020

(54) DYNAMIC FREQUENCY CONTROL IN POWER NETWORKS

(71) Applicant: California Institute of Technology, Pasadena, CA (US)

(72) Inventors: Changhong Zhao, Pasadena, CA (US); Enrique Mallada Garcia, Pasadena, CA (US); Steven H. Low, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 183 days.

(21) Appl. No.: 14/796,869

(22) Filed: Jul. 10, 2015

(65) Prior Publication Data

US 2016/0036225 A1 Feb. 4, 2016

Related U.S. Application Data

(60) Provisional application No. 62/022,861, filed on Jul. 10, 2014.

(51) Int. Cl.
*H02J 3/00* (2006.01)
*H02J 3/04* (2006.01)

(52) U.S. Cl.
CPC . *H02J 3/00* (2013.01); *H02J 3/04* (2013.01)

(58) Field of Classification Search
None
See application file for complete search history.

(56) References Cited

U.S. PATENT DOCUMENTS 8,407,016 B2   3/2013 Slota et al.
9,225,171 B2   12/2015 Chen et al.
(Continued)

FOREIGN PATENT DOCUMENTS

JP   2012034452 A   2/2012
JP   2012083989 A   4/2012
(Continued)

OTHER PUBLICATIONS

Changhong Zhao, Ufuk Topcu, Na Li and Steven H. Low, Power System Dynamics as Primal-Dual Algorithm for Optimal Load Control, May 6, 2013, Retrieved from the Internet: <URL: http://smart.caltech.edu/papers/powersystemdynamics.pdf>.*
(Continued)

*Primary Examiner* — Kenneth M Lo
*Assistant Examiner* — Istiaque Ahmed
(74) *Attorney, Agent, or Firm* — KPPB LLP

(57) ABSTRACT

Node controllers in power distribution networks in accordance with embodiments of the invention enable dynamic frequency control. One embodiment includes a node controller comprising a network interface a processor; and a memory containing a frequency control application; and a plurality of node operating parameters describing the operating parameters of a node, where the node is selected from a group consisting of at least one generator node in a power distribution network wherein the processor is configured by the frequency control application to calculate a plurality of updated node operating parameters using a distributed process to determine the updated node operating parameter using the node operating parameters, where the distributed process controls network frequency in the power distribution network; and adjust the node operating parameters.

22 Claims, 27 Drawing Sheets

(56) References Cited

U.S. PATENT DOCUMENTS

| | | | |
|---|---|---|---|
| 9,954,362 | B2 | 4/2018 | Low et al. |
| 2008/0004721 | A1* | 1/2008 | Huff ...................... G06Q 10/04 700/48 |
| 2008/0005597 | A1 | 1/2008 | Kern et al. |
| 2011/0043220 | A1 | 2/2011 | Leibowitz et al. |
| 2012/0029720 | A1 | 2/2012 | Cherian et al. |
| 2012/0200160 | A1* | 8/2012 | Pratt ...................... H01M 10/44 307/48 |
| 2012/0203388 | A1 | 8/2012 | DiLuciano et al. |
| 2012/0316691 | A1 | 12/2012 | Boardman et al. |
| 2012/0326503 | A1 | 12/2012 | Birkelund et al. |
| 2013/0274941 | A1 | 10/2013 | Khozikov et al. |
| 2014/0032007 | A1 | 1/2014 | Claessens et al. |
| 2014/0060065 | A1* | 3/2014 | Sweet ...................... F02C 6/18 60/773 |
| 2014/0097683 | A1* | 4/2014 | Piyabongkarn .......... H02J 3/32 307/26 |
| 2014/0316604 | A1* | 10/2014 | Ortjohann ............... H02J 3/381 700/298 |
| 2015/0340863 | A1 | 11/2015 | Qiuyu et al. |
| 2016/0009192 | A1 | 1/2016 | Zhang et al. |
| 2016/0036226 | A1 | 2/2016 | Gan et al. |
| 2016/0248254 | A1* | 8/2016 | Huomo ............... H02J 13/0006 |
| 2017/0110895 | A1 | 4/2017 | Low et al. |
| 2019/0184850 | A1 | 6/2019 | Lee et al. |

FOREIGN PATENT DOCUMENTS

| | | |
|---|---|---|
| KR | 101566715 B1 | 11/2015 |
| WO | 2012015507 A1 | 2/2012 |
| WO | 2012058114 A2 | 5/2012 |
| WO | 2012167383 A1 | 12/2012 |
| WO | 2015179873 A1 | 11/2015 |
| WO | 2016007910 A1 | 1/2016 |
| WO | 2016022603 A1 | 2/2016 |
| WO | 2019109084 A1 | 6/2019 |

OTHER PUBLICATIONS

Na Li, Lijun Chen, Changhong Zhao and Steven H. Low, Connecting Automatic Generation Control and Economic Dispatch from an Optimization View, Jun. 4-6, 2014, 2014 American Control Conference (ACC), Retrieved from the Internet: <URL: http://ieeexplore.ieee.org/document/479119/>.*

Zhao et al., "Swing dynamics as primal-dual algorithm for optimal load control", 2012 IEEE Third International Conference on Smart Grid Communications (SmartGridComm), Nov. 5-8, 2012, Tainan, Taiwan, pp. 570-575.*

International Preliminary Report on Patentability for International Application PCT/US2015/040031, Report issued Jan. 10, 2017, dated Jan. 10, 2017, 7 Pgs.

International Search Report and Written Opinion for International Application PCT/US2015/040031, Report Completed Sep. 23, 2015, dated Sep. 24, 2015, 9 Pgs.

Andreasson et al., "Distributed Control of Networked Dynamical Systems: Static Feedback, Integral Action and Consensus", IEEE Transactions on Automatic Control, vol. 59, Issue 7, Jul. 2014, pp. 1750-1764.

Andreasson et al., "Distributed vs. Centralized Power Systems Frequency Control", 2013 European Control Conference (ECC), Jul. 17-19, 2013, Zurich, Switzerland, pp. 3524-3529.

Araposthatis et al., "Analysis of power-flow equation", International Journal of Electrical Power & Energy Systems, vol. 3, Issue 3, Jul. 1981, pp. 115-126.

Bergen et al., "Structure Preserving Model for Power System Stability Analysis", IEEE Transactions on Power Apparatus and Systems, vol. PAS-100, No. 1, Jan. 1981, pp. 25-35.

Boyd et al., "Convex Optimization", Cambridge University Press, 2004, 703 pages.

Brooks et al., "Demand Dispatch", IEEE Power and Energy Magazine, vol. 8, Issue 3, May-Jun. 2010, pp. 20-29.

Burger et al., "An internal model approach to (optimal) frequency regulation in power grids", arXiv:1403.7019, Mar. 27, 2014, 14 pages.

Callaway et al., "Achieving Controllability of Electric Loads", Proceedings of the IEEE, vol. 99, Issue 1, Jan. 2011, pp. 184-199.

Cheung et al., "Power System Toolbox Version 3.0", Rensselaer Polytechnic Institute and Cherry Tree Scientific Software, 2009, 123 pages.

Chow et al., "A toolbox for power system dynamics and control engineering education and research", IEEE Transactions on Power Systems, vol. 7, Issue 4, Nov. 1992, pp. 1559-1564.

Donnelly et al., "Frequency and Stability Control using Decentralized Intelligent Loads: Benefits and Pitfalls", IEEE PES General Meeting, Jul. 25-29, 2010, Providence, RI, USA, pp. 1-6.

Dorfler et al., "Breaking the Hierarchy: Distributed Control and Economic Optimality in Microgrids", IEEE Transactions on Control of Network Systems, vol. 3, Issue 3, Sep. 2016, pp. 241-253.

Dorfler et al., "Plug-and-Play Control and Optimization in Microgrids", 53rd IEEE Conference on Decision and Control, Dec. 15-17, 2014, Los Angeles, CA, USA, pp. 211-216.

Feijer et al., "Stability of primal—dual gradient dynamics and applications to network optimization", Automatica, vol. 46, Issue 12, Dec. 2010, pp. 1974-1981.

Guo et al., "Nonlinear decentralized control of large-scale power systems", Automatica, vol. 36, Issue 9, Sep. 2000, pp. 1275-1289.

Hammerstrom et al., "Pacific Northwest GridWise Testbed Demonstration Projects Part II. Grid Friendly Appliance Project", Pacific Northwest National Laboratory, Technical Report No. PNNL-17079, Oct. 2007, 123 pages.

Hill et al., "Stability analysis of multimachine power networks with linear frequency dependent loads", IEEE Transactions on Circuits and Systems, vol. 29, Issue 12, Dec. 1982, pp. 840-848.

Ilic, Marija D., "From Hierarchical to Open Access Electric Power Systems", Proceedings of the IEEE, vol. 95, Issue 5, May 2007, pp. 1060-1084.

Jiang et al., "Toward a Globally Robust Decentralized Control for Large-Scale Power Systems", IEEE Transactions on Control Systems Technology, vol. 5, Issue 3, May 1997, pp. 309-319.

Kelly et al., "Rate Control for Communication Networks: Shadow Prices, Proportional Fairness and Stability", The Journal of the Operational Research Society, vol. 49, No. 3, Mar. 1998, p. 237-252.

Kiani et al., "A Hierarchical Transactive Control Architecture for Renewables Integration in Smart Grids", 2012 IEEE 51st IEEE Conference on Decision and Control (CDC), Dec. 10-13, 2012, Maui, HI, USA, pp. 4985-4990.

Li et al., "Connecting Automatic Generation Control and Economic Dispatch from an Optimization View", 2014 American Control Conference (ACC), Jun. 4-6, 2014, Portland, Oregon, USA, pp. 735-740.

Li et al., "Optimal Demand Response Based on Utility Maximization in Power Networks", 2011 IEEE Power and Energy Society General Meeting, Jul. 24-29, 2011, Detroit, MI, USA, pp. 1-8.

Liu et al., "Decentralized Multi-Agent System-Based Cooperative Frequency Control for Autonomous Microgrids With Communication Constraints", IEEE Transactions on Sustainable Energy, vol. 5, Issue 2, Apr. 2014, pp. 446-456.

Low et al., , "Optimization Flow Control-I: Basic Algorithm and Convergence", IEEE/ACM Transactions on Networking, vol. 7, Issue 6, Dec. 1999, pp. 861-874.

Lu et al., "Design Considerations for Frequency Responsive Grid Friendly Appliances", 2005/2006 IEEE/PES Transmission and Distribution Conference and Exhibition, May 21-24, 2006, Dallas, TX, USA, pp. 647-652.

Lu et al., "Nonlinear stabilizing control of multimachine systems", IEEE Transactions on Power Systems, vol. 4, Issue 1, Feb. 1989, pp. 236-241.

Mallada et al., "Distributed Frequency-Preserving Optimal Load Control", Proceedings of the 19th World Congress, IFAC Proceedings Volumes, vol. 47, Issue 3, Aug. 24-29, 2014, Cape Town, South Africa, pp. 5411-5418.

(56) References Cited

OTHER PUBLICATIONS

Mallada et al., "Fair load-side control for frequency regulation in smart grids", Proc. of Allerton Conference on Communication, Control, and Computing, Monticello, IL, USA, 2014, 10 pages.
Molina-Garcia et al., "Decentralized Demand-Side Contribution to Primary Frequency Control", IEEE Transactions on Power Systems, vol. 26, Issue 1, Feb. 2011, pp. 411-419.
Moon et al., "The development of equivalent system technique for deriving an energy function reflecting transfer conductances", IEEE Transactions on Power Systems, vol. 14, Issue 4, Nov. 1999, pp. 1335-1341.
Ortega et al., "Transient stabilization of multimachine power systems with nontrivial transfer conductances", IEEE Transactions on Automatic Control, vol. 50, Issue 1, Jan. 2005, pp. 60-75.
Palomar et al., "A tutorial on decomposition methods for network utility maximization", IEEE Journal on Selected Areas in Communications, vol. 24, Issue 8, Aug. 2006, pp. 1439-1451.
Qu et al., "Application of robust control to sustained oscillations in power systems", IEEE Transactions on Circuits and Systems I: Fundamental Theory and Applications, vol. 39, Issue 6, Jun. 1992, pp. 470-476.
Schweppe et al., "Homeostatic Utility Control", IEEE Transactions on Power Apparatus and Systems, vol. PAS-99, Issue 3, May 1980, pp. 1151-1163.
Shafiee et al., "Distributed Secondary Control for Islanded Microgrids—A Novel Approach", IEEE Transactions on Power Electronics, vol. 29, Issue 2, Feb. 2014, pp. 1018-1031.
Short et al., "Stabilization of Grid Frequency Through Dynamic Demand Control", IEEE Transactions on Power Systems, vol. 22, Issue 3, Aug. 2007, pp. 1284-1293.
Siljak et al., "Robust decentralized turbine/governor control using linear matrix inequalities", IEEE Transactions on Power Systems, vol. 17, Issue 3, Aug. 2002, pp. 715-722.
Simpson-Porco et al., "Stability, power sharing, & distributed secondary control in droop-controlled microgrids", 2013 IEEE International Conference on Smart Grid Communications (SmartGridComm), Oct. 21-24, 2013, Vancouver, BC, Canada, pp. 672-677.
Simpson-Porco et al., "Synchronization and power sharing for droop-controlled inverters in islanded microgrids", Automatica, vol. 49, Issue 9, Sep. 2013, pp. 2603-2611.
Topcu et al., "Compositional stability analysis based on dual decomposition", Proceedings of the 48h IEEE Conference on Decision and Control (CDC) held jointly with 2009 28th Chinese Control Conference, Dec. 15-18, 2009, Shanghai, China, pp. 1175-1180.
Trudnowski et al., "Power-System Frequency and Stability Control using Decentralized Intelligent Loads", 2005/2006 IEEE/PES Transmission and Distribution Conference and Exhibition, May 21-24, 2006, Dallas, TX, USA, pp. 1453-1459.
Tsolas et al., "A structure preserving energy function for power system transient stability analysis", IEEE Transactions on Circuits and Systems, vol. 32, Issue 10, Oct. 1985, pp. 1041-1049.
Wang et al., "Robust decentralized control for multimachine power systems", IEEE Transactions on Circuits and Systems I: Fundamental Theory and Applications, vol. 45, Issue 3, Mar. 1998, pp. 271-279.
You et al., "Reverse and forward engineering of frequency control in power networks", 53rd IEEE Conference on Decision and Control, Dec. 15-17, 2014, Los Angeles, CA, USA, pp. 191-198.
Zhang et al., "A real-time control framework for smart power networks with star topology", 2013 American Control Conference, Jun. 17-19, 2013, Washington, DC, USA, pp. 5062-5067.
Zhang et al., "Distributed dynamic feedback control for smart power networks with tree topology", 2014 American Control Conference, Jun. 4-6, 2014, Portland, OR, USA, pp. 1156-1161.
Zhao et al., "Design and Stability of Load-Side Primary Frequency Control in Power Systems", IEEE Transactions on Automatic Control, vol. 59, Issue 5, May 2014, pp. 1177-1189.
Zhao et al., "Power System Dynamics as Primal-Dual Algorithm for Optimal Load Control", arXiv:1305.0585, May 6, 2013, pp. 1-35.

"Dynamic demand control of domestic appliances", U. K. Market Transformation Program, Market Transformation Programme, Tech. Rep., 2008, published Nov. 30, 2010, 22 pages.
Bacciotti et al., , "Nonpathological Lyapunov functions and discontinuous Carath'eodory systems", Automatica, vol. 42, Issue 3, Mar. 31, 2006, pp. 453-458.
Cherukuri et al., "Asymptotic convergence of primal-dual dynamics", Systems & Control Letters, vol. 87, Jan. 31, 2016, pp. 10-15.
Dupuis, , "Dynamical systems and variational inequalities", Annals of Operations Research, vol. 44, No. 1, Feb. 28, 1993, pp. 7-42.
Lygeros et al., , "Dynamical properties of hybrid automata", IEEE Transactions on Automatic Control, vol. 48, Issue 1, Jan. 31, 2003, pp. 2-17.
Mallada et al., , "Optimal load-side control for frequency regulation in smart grids", 2014 52nd Annual Allerton Conference on Communication, Control, and Computing (Allerton), Sep. 30, 2014-Oct. 3, 2014, pp. 731-738,.
International Preliminary Report on Patentability for International Application PCT/US2015/043676, Report issued Feb. 7, 2017, dated Feb. 16, 2017, 6 Pgs.
International Search Report and Written Opinion for International Application No. PCT/US2015/043676, Search completed Oct. 27, 2015, dated Oct. 27, 2015, 8 Pgs.
Alsac et al., "Further developments in LP-based optimal power flow", IEEE Transactions on Power Systems, vol. 5, Issue 3, Aug. 1990, pp. 697-711.
Baptista, E. C. et al., "Logarithmic barrier-augmented lagrangian function to the optimal power flow problem", International Journal on Electrical Power and Energy Systems, Jun. 23, 2005, vol. 27, No. 7, pp. 528-532.
Baran, M. E. et al., "Network reconfiguration in distribution systems for loss reduction and load balancing", IEEE Transactions on Power Delivery, Apr. 1989, vol. 4, No. 2, pp. 1401-1407.
Capitanescu, F. et al., "Interior-point based algorithms for the solution of optimal power flow problems", Electric Power Systems Research, vol. 77, Issues 5-6, Apr. 2007, pp. 508-517, https://doi.org/10.1016/j.epsr.2006.05.003.
Contaxis, G. C. et al., "Decoupled Optimal Load Flow Using Linear or Quadratic Programming", IEEE Transactions on Power Systems, vol. 1, Issue 2, May 1986, pp. 1-7.
Farivar, M. et al., "Inverter VAR control for distribution systems with renewables", In IEEE SmartGridComm, Oct. 17-20, 2011, pp. 457-462.
Farivar, M. et al., "Optimal Inverter VAR Control in Distribution Systems with High PV Penetration", In PES General Meeting, Jul. 22-26, 2012, pp. 1-7.
Gan, L. et al., "Convex Relaxations and Linear Approximation for Optimal Power Flow in Multiphase Radial Networks", In Power systems computation conference, Aug. 18-22, 2014, 9 pgs.
Grant, M. et al., "Cvx: Matlab software for disciplined convex programming", online at http://cvxr.com/cvx/, 2008, 2 pgs.
Jabr, R. A. et al., "A primal-dual interior-point method to solve the optimal power flow dispatching problem", Optimization and Engineering, Feb. 12, 2003, vol. 4, No. 4, pp. 309-336.
Min, W. et al., "A trust region interior point algorithm for optimal power flow problems", Electrical Power and Energy Systems, May 2005, vol. 27, No. 4, pp. 293-300.
Sousa, A. A. et al., "Robust optimal power flow solution using trust region and interior methods", IEEE Transactions on Power Systems, May 2011, vol. 26, No. 2, pp. 487-499.
Stott, B. et al., "DC power flow revisited", IEEE Transactions on Power Systems, Aug. 2009, vol. 24, No. 3, pp. 1290-1300.
Stott, B. et al., "Fast decoupled load flow", IEEE Transactions on Power Apparatus and Systems, May 1974, vol. PAS-93(3), pp. 859-869.
Sturm, "Using SeDuMi 1.02, a matlab toolbox for optimization over symmetric cones", Optimization Methods and Software, Mar. 1999, vol. 11, No. 1-4, pp. 625-653.
Torres, G. L. et al., "An interior-point method for nonlinear optimal power flow using voltage rectangular coordinates", IEEE Transactions on Power Systems, Nov. 1998, vol. 13, No. 4, pp. 1211-1218.

(56) References Cited

OTHER PUBLICATIONS

Turitsyn, K. et al., "Local control of reactive power by distributed photovoltaic generators", In IEEE SmartGridComm, Oct. 4-6, 2010, pp. 79-84.

Xiao, Y. et al., "Power flow control approach to power systems with embedded FACTS devices", IEEE Transactions on Power Systems, Nov. 2002, vol. 17, No. 4, pp. 943-950.

"SAE Electric Vehicle and Plug in Hybrid Electric Vehicle Conductive Charge Coupler J1772_201710", SAE International, Oct. 1, 1996, Revised: Oct. 13, 2017, 59 pgs.

Bohn et al., "A real world technology testbed for electric vehicle smart charging systems and PEV-EVSE interoperability evaluation", Proceedings of the IEEE Energy Conversion Congress and Exposition (ECCE), Milwaukee, Wisconsin, Sep. 18-22, 2016, pp. 1-8.

Bohn et al., "Local automatic load control for electric vehicle smart charging systems extensible via OCPP using compact submeters", Proceedings of the IEEE Transportation Electrification Conference and Expo (ITEC), Chicago, Illinois, Jun. 22-24, 2017, 8 pgs.

Cross et al., "My Electric Avenue: Integrating electric vehicles into the electrical networks", Proceedings of the Hybrid and Electric Vehicles Conference (HEVC 2016), London, United Kingdom, Nov. 2-3, 2016, 6 pgs.

Lee et al., "Adaptive charging network for electric vehicles", Proceedings of the IEEE Global Conference on Signal and Information Processing (GlobalSIP), Washington D.C., Dec. 7-9, 2016, 5 pgs.

Mukherjee et al., "A Review of Charge Scheduling of Electric Vehicles in Smart Grid", IEEE Systems Journal, vol. 9, No. 4, Dec. 2015, pp. 1541-1553.

International Preliminary Report on Patentability for International Application PCT/US2015/032482, Report issued Nov. 29, 2016, dated Dec. 8, 2016, 12 Pgs.

International Search Report and Written Opinion for International Application No. PCT/US2018/063637, Search completed Apr. 1, 2019, dated Apr. 1, 2019, 9 Pgs.

International Search Report and Written Opinion for International Application PCT/US2015/032482, Report completed Sep. 9, 2015, dated Sep. 9, 2015, 15 pages.

"Gurobi Optimizer Reference Manual", Gurobi Optimization, Version 6.5, 2016, 592 pgs.

Bai et al., "Semidefinite Programming for Optimal Power Flow Problems", Electrical Power and Energy Systems, 2008, vol. 30, pp. 383-392.

Baldick et al., "A Fast Distributed Implementation of Optimal Power Flow", IEEE Transactions on Power Systems, vol. 14, Issue 3, Aug. 1999, pp. 858-864.

Baran et al., "Optimal Capacitor Placement on Radial Distribution Systems", IEEE Transactions on Power Delivery, vol. 4, Issue 1, Jan. 1989, pp. 725-734.

Baran et al., "Optimal Sizing of Capacitors Placed on a Radial Distribution System", IEEE Transactions on Power Delivery, vol. 4, Issue 1, Jan. 1989, pp. 735-743.

Boyd et al., "Distributed Optimization and Statistical Learning via the Alternating Direction Method of Multipliers", Foundations and Trends in Machine Learning, vol. 3, No. 1, 2010, pp. 1-122.

Chen et al., "iEMS for Large Scale Charging of Electric Vehicles: Architecture and Optimal Online Scheduling", 2012 IEEE Third International Conference on Smart Grid Communications (SmartGridComm), Nov. 5-8, 2012, Tainan, Taiwan, pp. 629-634.

Chung et al., "Master-Slave Control Scheme in Electric Vehicle Smart Charging Infrastructure", The Scientific World Journal, vol. 2014, No. 462312, May 26, 2014, 14 pages.

Chynoweth et al., "Smart Electric Vehicle Charging Infrastructure Overview", Proceedings of the 5th IEEE PES Innovative Smart Grid Technologies (ISGT), Washington D.C., Feb. 19-22, 2014, 5 pgs.

Dall'Anese et al., "Distributed Optimal Power Flow for Smart Microgrids", IEEE Transactions on Smart Grid, arXiv:1211.5856v5, Jan. 25, 2014, pp. 1-11, Retrieved from the Internet: http://arxiv.org/pdf/1211.5856.pdf>.

Devane et al., "Stability and convergence of distributed algorithms for the OPF problem", 52nd IEEE Conference on Decision and Control, Dec. 10-13, 2013, Florence, Italy, pp. 2933-2938.

Farivar et al., "Branch Flow Model: Relaxations and Convexification (Part I, II)", IEEE Trans. on Power Systems, Aug. 2013, vol. 28, No. 3, pp. 2554-2572.

Gan et al., "Exact Convex Relaxation of Optimal Power Flow in Radial Networks", IEEE Transactions on Automatic Control, vol. 60, Issue 1, Jan. 2015, pp. 72-87.

Gan et al., "Optimal Power Flow in Distribution Networks", Proc. 52nd IEEE Conference on Decision and Control, Dec. 2013, in arXiv:12084076, 7 pgs.

Guo et al., "Optimal Online Adaptive Electric Vehicle Charging", Proceedings of the IEEE Power & Energy Society General Meeting, Chicago, Illinois, Jul. 16-20, 2017, 5 pgs.

Jabr et al., "Radial Distribution Load Flow Using Conic Programming", IEEE Transactions on Power Systems, Aug. 2006, vol. 21, Issue 3, pp. 1458-1459.

Jakobsson, Martin, "On Some Extensions and Performance of Fast-Lipschitz Optimization", Master's Degree Project Stockholm, Sweden, Oct. 2011. Retrieved from the Internet: <http://www.diva-portal.org/smash/get/diva2:471914/FULLTEXT01.pdf>, 84 pgs.

Kim et al., "Coarse-Grained Distributed Optimal Power Flow", IEEE Transactions on Power Systems, vol. 12, Issue 2, May 1997, pp. 932-939.

Kraning et al., "Dynamic Network Energy Management via Proximal Message Passing", Foundations and Trends in Optimization, vol. 1, No. 2, 2013, pp. 70-122.

Lam et al., "Optimal Distributed Voltage Regulation in Power Distribution Networks", arXiv:1204.5226, Apr. 23, 2012, retrieved from https://arxiv.org/abs/1204.5226v1, 24 pages.

Lam et al., "Distributed Algorithms for Optimal Power Flow Problem", Decision and Control (CDC), 2012 IEEE 51st Annual Conference on IEEE, 2012, pp. 430-437.

Li et al., "Demand Response in Radial Distribution Networks: Distributed Algorithm", 2012 Conference Record of the Forty Sixth Asilomar Conference on Signals, Systems and Computers (ASILOMAR), Nov. 4-7, 2012, Pacific Grove, CA, USA, pp. 1549-1553.

Low, "Convex Relaxation of Optimal Power Flow Part I: Formulations and Equivalence", IEEE Trans. on Control of Network Systems, vol. 1, No. 1, Mar. 2014, 44 pgs.

Low, "Convex Relaxation of Optimal Power Flow—Part II: Exactness", IEEE Transactions on Control of Network Systems, Jun. 2014, vol. 1, No. 2, pp. 177-189.

Nakahira et al., "Smoothed Least-laxity-first Algorithm for EV Charging", Proceedings of the 8th International Conference on Future Energy Systems, Shatin, Hong Kong, China, May 16-19, 2017, pp. 242-251.

Peng et al., "Distributed Algorithm for Optimal Power Flow on a Radial Network", 53rd IEEE Conference on Decision and Control, Dec. 15-17, 2014, Los Angeles, CA, USA, pp. 167-172.

Peng et al., "Feeder Reconfiguration in Distribution Networks based on Convex Relaxation of OPF", IEEE Transactions on Power Systems, vol. 30, Issue 4, Jul. 2015, pp. 1793-1804.

Petroff, "These countries want to ditch gas and diesel cars", CNN Business, Jul. 26, 2017, Retrieved from: https://money.cnn.com/2017/07/26/autos/countries-that-are-banning-gas-cars-for-electric/index.html, 3 pgs.

Phan et al., "Distributed Methods for Solving the Security-Constrained Optimal Power Flow Problem", IEEE PES Innovative Smart Grid Technologies (ISGT), Jan. 16-20, 2012, 7 Pgs.

Srinivasa et al., "HERB: a home exploring robotic butler", Autonomous Robots, 2010, vol. 28, pp. 5-20.

Sun et al., "Fully Decentralized AC Optimal Power Flow Algorithms", 2013 IEEE Power & Energy Society General Meeting, Jul. 21-25, 2013, Vancouver, BC, Canada, pp. 1-5.

Taylor et al., "Convex models of distribution system reconfiguration", IEEE Transactions on Power Systems, vol. 6, No. 1, Jan. 2007, pp. 1407-1413.

(56) References Cited

OTHER PUBLICATIONS

Wang et al., "Predictive Scheduling Framework for Electric Vehicles With Uncertainties of User Behaviors", IEEE Internet of Things Journal, vol. 4, No. 1, Feb. 2017, pp. 52-63.

Wang et al., "Smart Charging for Electric Vehicles: A Survey From the Algorithmic Perspective", IEEE Communications Surveys & Tutorials, vol. 18, No. 2, Jan. 14, 2016, pp. 1500-1517.

Yu et al., "An Intelligent Energy Management System for Large-Scale Charging of Electric Vehicles", CSEE Journal of Power and Energy Systems, vol. 2, No. 1, Mar. 24, 2016, pp. 47-53.

Yu et al., "Demand Response via Large Scale Charging of Electric Vehicles", Proceedings of the IEEE Power and Energy Society General Meeting (PESGM), Boston, Massachusetts, Jul. 17-21, 2016, 5 pgs.

* cited by examiner

US 10,673,232 B2

DYNAMIC FREQUENCY CONTROL IN POWER NETWORKS

CROSS-REFERENCE TO RELATED APPLICATIONS

The present invention claims priority to U.S. Provisional Patent Application Ser. No. 62/022,861 entitled "Load-Side Frequency Control in Power Systems" to Zhao et al., filed Jul. 10, 2014. The disclosure of U.S. Provisional Patent Application Ser. No. 62/022,861 is herein incorporated by reference in its entirety.

STATEMENT OF FEDERALLY SPONSORED RESEARCH

This invention was made with government support under DE-AR0000226 awarded by the U.S. Department of Energy and CNS0911041 awarded by the National Science Foundation. The government has certain rights in the invention.

FIELD OF THE INVENTION

The present invention generally relates to optimal frequency control and more specifically relates to load side processes for solving for optimal frequency control.

BACKGROUND

An incredible amount of infrastructure is relied upon to transport electricity from power stations, where the majority of electricity is currently generated, to individual homes. Power stations can generate electricity in a number of ways including using fossil fuels or using renewable sources of energy such as solar, wind, and hydroelectric sources. Once electricity is generated it travels along transmission lines to substations. Substations typically do not generate electricity, but can change the voltage level of the electricity as well as provide protection to other grid infrastructure during faults and outages. From here, the electricity travels over distribution lines to bring electricity to individual homes. The infrastructure used to transport electricity through the power grid can be viewed as a graph comprised of nodes and lines. The power stations, substations, and any end user can be considered nodes within the graph. Transmission and distribution lines connecting these nodes can be represented by lines.

Distributed power generation, electricity generation at the point where it is consumed, is on the rise with the increased use of residential solar panels and is fundamentally changing the path electricity takes to many users' homes. The term "smart grid" describes a new approach to power distribution which leverages advanced technology to track and manage the distribution of electricity. A smart grid applies upgrades to existing power grid infrastructure including the addition of more renewable energy sources, advanced smart meters that digitally record power usage in real time, and bidirectional energy flow that enables the generation and storage of energy in additional locations along the electrical grid.

SUMMARY OF THE INVENTION

Node controllers in power distribution networks in accordance with embodiments of the invention enable dynamic frequency control. One embodiment includes a node controller comprising a network interface a processor; and a memory containing a frequency control application; and a plurality of node operating parameters describing the operating parameters of a node, where the node is selected from a group consisting of at least one generator node in a power distribution network wherein the processor is configured by the frequency control application to calculate a plurality of updated node operating parameters using a distributed process to determine the updated node operating parameter using the node operating parameters, where the distributed process controls network frequency in the power distribution network; and adjust the node operating parameters.

In a further embodiment, the node operating parameters include a node frequency.

In another embodiment, the node operating parameters include generator node parameters.

In a still further embodiment, the node operating parameters include a bounded control variable.

In further additional embodiments, to calculate a plurality of updated node operating parameters using a distributed process processor using the following expression:

$$p_j^c(\omega_j) = [(c_j')^{-1}(-\omega_j)]_{\underline{p}_j}^{\overline{p}_j} \quad j \in \mathcal{G}$$

where $p^c$ is a frequency control parameter, $\omega$ is a frequency, c is a cost or disutility function, $\underline{p}_j$ and $\overline{p}_j$ are bounds on the frequency control parameter, j is the node, and $\mathcal{G}$ is the at least one generator node.

In still another embodiment, a node controller comprising: a network interface; a processor; and a memory containing: a frequency control application; and a plurality of node operating parameters describing the operating parameters of a node, where the node is selected from a group consisting of at least one load node in a power distribution network; wherein the processor is configured by the frequency control application to: calculate a plurality of updated node operating parameters using a distributed process to determine the updated node operating parameter using the node operating parameters, where the distributed process controls network frequency in the power distribution network; and adjust the node operating parameters.

In a yet further embodiment, the node operating parameters include a node frequency.

In a still yet further embodiment, the node operating parameters include lode node parameters.

In another embodiment, the node operating parameters include a bounded control variable.

In yet another embodiment includes to calculate a plurality of updated node operating parameters using a distributed process is evaluated by the processor using the following expression:

$$p_j(\omega_j) = [(c_j')^{-1}(-\omega_j)]_{\underline{p}_j}^{\overline{p}_j} \quad j \in \mathcal{L}$$

where p is a frequency control parameter, $\omega$ is a frequency, c is a cost or disutility function, $\underline{p}_j$ and $\overline{p}_j$ are bounds on the frequency control parameter, j is the node, and $\mathcal{L}$ is the at least one load node.

In a further embodiment again includes adjusting the node operating parameters further comprises constraining the node operating parameters within thermal limits.

In another embodiment again includes a power distribution network, comprising one or more centralized computing systems; a communications network; a plurality of generator node controllers, where each generator node controller in the plurality of generator node controllers contains: a generator network interface; a generator node processor; and a generator memory containing: a frequency control application; and a plurality of generator node operating parameters describing the operating parameters of a generator node in a power distribution network; where the generator node processor is configured by the frequency control application to: calculate a plurality of updated generator node operating parameters using a distributed process to determine the updated generator node operating parameter using the generator node operating parameters, where the distributed process controls network frequency in the power distribution network; and adjust the generator node operating parameters; and a plurality of load node controllers, where each load node controller in the plurality of generator node controllers contains: a load network interface; a load node processor; and a load memory containing: the frequency control application; and a plurality of load node operating parameters describing the operating parameters of a load node in the power distribution network; where the load node processor is configured by the frequency control application to: calculate a plurality of updated load node operating parameters using the distributed process to determine the updated load node operating parameter using the load node operating parameters, where the distributed process controls network frequency in the power distribution network; and adjust the load node operating parameters.

In a still further embodiment again, the generator node operating parameters include a node frequency.

In still yet another embodiment, the load node operating parameters include a node frequency.

In a still further embodiment again includes the generator node operating parameters include a bounded control variable.

In still another embodiment again, the load node operating parameters include a bounded control variable.

In a further additional embodiment, to calculate a plurality of updated generator node operating parameters using a distributed process is evaluated by the processor using the following expression:

$$p_j^c(\omega_j) = [(c_j')^{-1}(-\omega_j)]_{\underline{p}_j}^{\overline{p}_j} \quad j \in \mathcal{G}$$

where $p^c$ is a frequency control parameter, $\omega$ is a frequency, c is a cost or disutility function, $\underline{p}_j$ and $\overline{p}_j$ are bounds on the frequency control parameter, j is the node, and $\mathcal{G}$ is the at least one generator node.

In another additional embodiment, to calculate a plurality of updated load node operating parameters using the distributed process is evaluated by the processor using the following expression:

$$p_j(\omega_j) = [(c_j')^{-1}(-\omega_j)]_{\underline{p}_j}^{\overline{p}_j} \quad j \in \mathcal{L}$$

where p is a frequency control parameter, $\omega$ is a frequency, c is a cost or disutility function, $\underline{p}_j$ and $\overline{p}_j$ are bounds on the frequency control parameter, j is the node, and $\mathcal{L}$ is the at least one load node.

DETAILED DESCRIPTION

Turning now to the drawings, systems and methods for dynamic load control in power networks in accordance with embodiments of the invention are illustrated. Power frequency control maintains frequency in a power distribution network as power supply and demand change. Frequency control traditionally occurs on the generator side of the power distribution network, but it can also occur on the load side of the network. A power distribution network can be partitioned into generator side and load side portions based on supply or demand roles.

An optimization problem can be utilized to increase the performance of the network with respect to particular goals. The optimal frequency control (OFC) problem typically seeks to minimize total generation cost, user disutility, and/or other operational constraints, and will be the focus of SECTION 1 below. In several embodiments, the OFC problem can maintain power balance across an entire power distribution network by controlling frequency on the generation side and/or the load side.

The OFC problem can be solved when equilibrium points are found. In various embodiments, an approach to solving for these equilibrium points is through the use of a primal-dual algorithm approach. An extension of this approach is to use partial primal-dual algorithms. Primal-dual algorithms can lend nicely to distributed solutions and these distributed solutions can then be utilized to develop control processes for components of the power distribution networks. Specifically, distributed solutions frequently do not require explicit communication between portions of the network and/or knowledge of overall system parameters. In many embodiments, generator side and load side frequency control occur simultaneously to solve for OFC. Generating power in a power distribution network can be a complicated process. In various embodiments, models used for solving the OFC problem can include power generation with the addition of turbines and governors.

An alternative optimization problem, the optimal load control (OLC) problem will be the focus of SECTION 2 further below. The OLC problem seeks to minimize aggregate disutility. In many embodiments, the OLC problem can balance power across an entire network by controlling aggregate load on the load side. Similar to SECTION 1, a primal-dual algorithm can be used, which lends itself to a distributed solution. In various embodiments it can be useful to add additional constraints to an increasingly complicated model, for example (but not limited to) to constrain the power line flow within thermal limits.

Frequency in Power Networks

Figure 1:
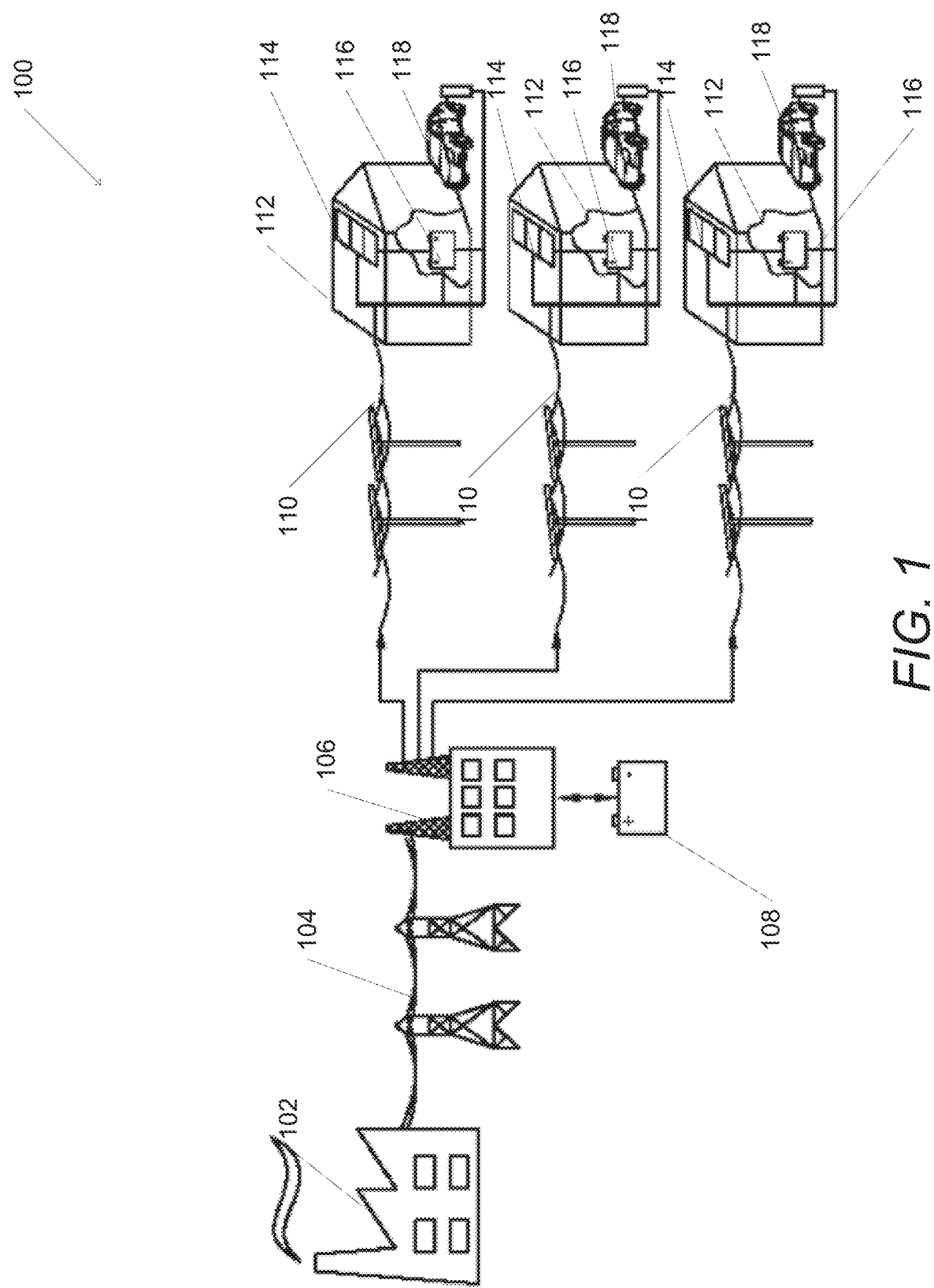
FIG. 1 is a diagram conceptually illustrating a power distribution network in accordance with an embodiment of the invention.

A power distribution network in accordance with an embodiment of the invention is shown in FIG. 1. Electricity is generated in power generator 102. Power transmission lines 104 can transmit electricity between the power generator and power substation 106. Power substation 106 additionally can connect to large storage battery 108, which temporarily stores electricity, as well as power distribution lines 110. The power distribution lines 110 can transmit electricity from the power substation to homes 112. The homes can include solar panels 114, a house battery 116, and/or an electric car 118. In a number of embodiments, processes are utilized that achieve OFC and/or OLC in power distribution networks.

The power generator 102 can represent a power source including those using fossil fuels, nuclear, solar, wind, and/or hydroelectric power. In various embodiments, multiple power generators 102 may be present. Substation 106 changes the voltage of the electricity for more efficient power distribution. Solar panels 114 are distributed power generation sources, and can generate power to supply the home as well as generate additional power for the power grid. House battery 116 can store excess electricity from the solar panels to power the home when solar energy is unavailable, or store electricity from the power grid to use at a later time. Substations 106, large storage batteries 108, homes 112, solar panels 114, house batteries 116, and electric cars 118 can all be considered to be nodes within the power distribution network and the distribution lines 110 can be considered to be lines within the power distribution network. Additional items that draw electricity may also be located within house 112 including (but not limited to) washing machines, dryers, refrigerators, hair dryers, computers, lamps, and/or televisions. In some embodiments these additional items can also be nodes. In combination, nodes and lines form a power distribution network.

Nodes within the power distribution network may have different roles. Nodes that are creating power (such as power generator 102 or solar panels 114) can be generator nodes on the generator side of the network, and nodes which consume power (such as electric cars 118 or additional items connected to the network within a house) can be load nodes on the load side of the network. In many embodiments, OFC and/or OLC can be attained through generator side frequency control, load side frequency control, and/or a combination of generator and load side frequency control.

In many embodiments, node controllers are located at nodes throughout the network to control the operating parameters of different nodes to achieve OFC and/or OLC. Connected nodes can be nodes within the power distribution network that are connected by distribution and/or transmission lines and can be controlled by a node controller. The type of control utilized can depend on the specifics of the network and may include distributed, centralized, and/or hybrid power control. Although many different systems are described above with reference to FIG. 1, any of a variety of power distribution networks including node controllers may be utilized to perform power distribution as appropriate to the requirements of specific applications in accordance with embodiments of the invention. Nodes utilizing node controllers connected to a communication network in accordance with various embodiments of the invention are discussed further below.

Node Controller Architectures

Figure 2:
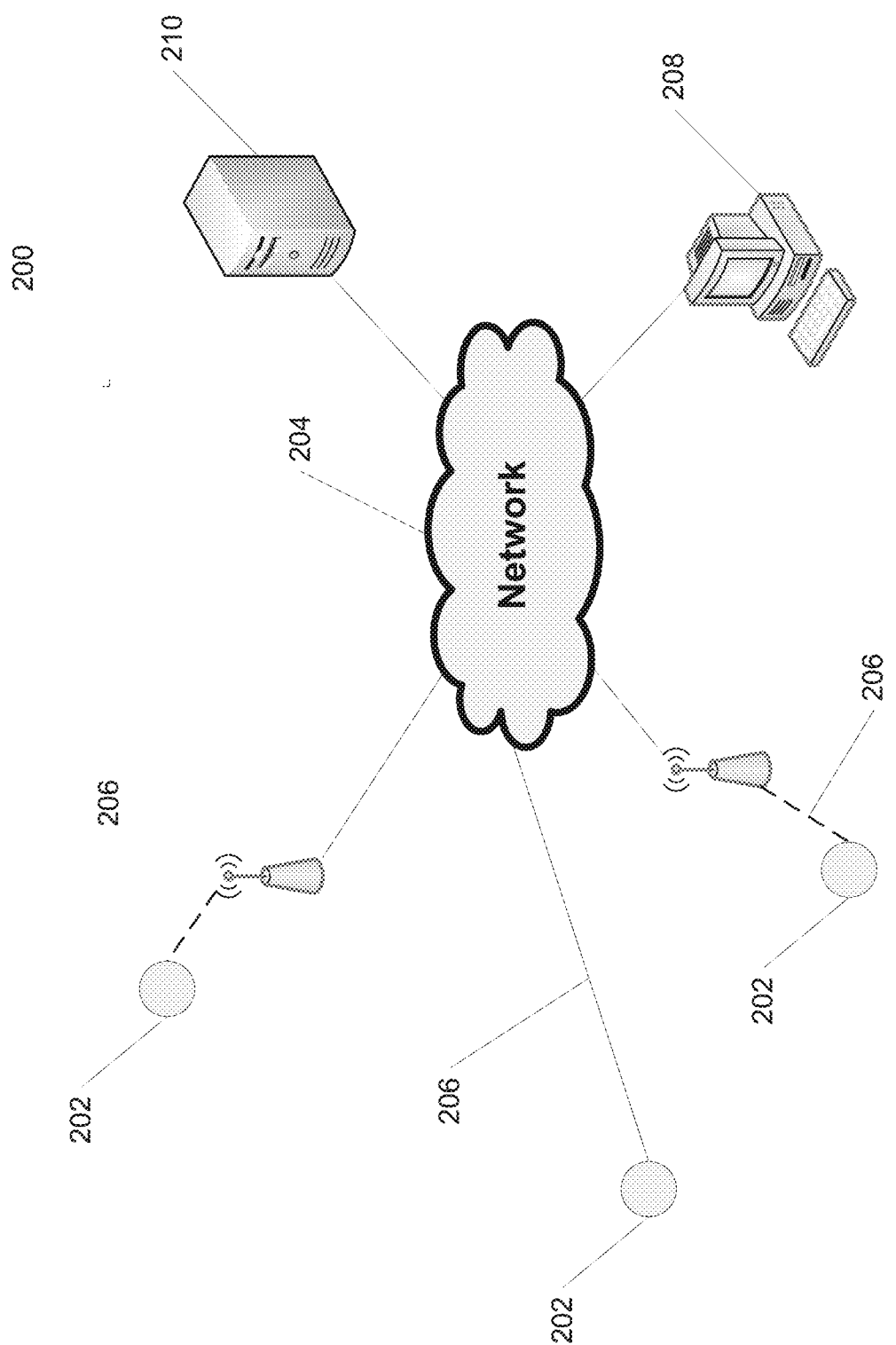
FIG. 2 is a diagram conceptually illustrating nodes utilizing node controllers connected to a communications network in accordance with an embodiment of the invention.

Nodes utilizing node controllers connected to a communication network in accordance with an embodiment of the invention are shown in FIG. 2. Nodes 202 can connect to communication network 204 using a wired and/or wireless connection 206. In some embodiments the power distribution network can act in place of the communication network. The communication network may also be connected to one or more centralized computer systems 208 to monitor calculations made by or to send instructions to multiple node controllers to, for example, control power distribution in the network at a global level. Additionally, in many embodiments a database management system 210 can be connected to the network to track node data which, for example, may be used to historically track power usage and/or frequencies at various locations over time. Although various system configurations are described above with reference to FIG. 2, any number of systems can be utilized to achieve control of nodes within a power distribution network as appropriate to the requirements of specific applications in accordance with embodiments of the invention. Node controllers for OFC in accordance with various embodiments of the invention are discussed further below.

Section 1
Node Controllers for Optimal Frequency Control

Figure 3:
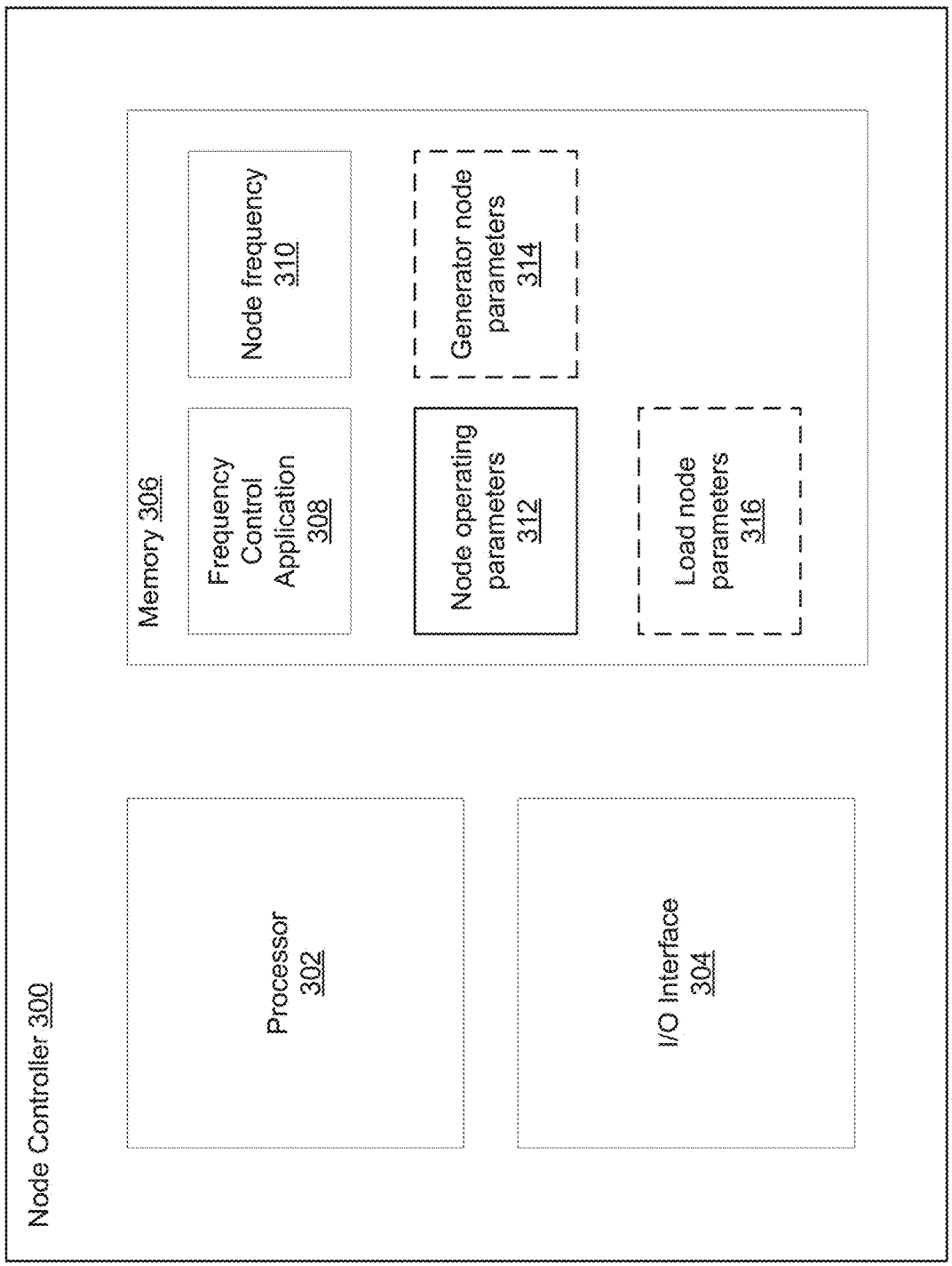
FIG. 3 is a block diagram illustrating a node controller for optimum frequency control in accordance with an embodiment of the invention.

A node controller in accordance with an embodiment of the invention is shown in FIG. 3. In various embodiments, node controller 300 can perform calculations in a distributed manner at a node in a power distribution network. The node controller includes at least one processor 302, an I/O interface 304, and memory 306. The at least one processor 302, when configured by software stored in memory, can perform calculations on and make changes to data passing through the I/O interface as well as to data stored in memory. In many embodiments, the memory 306 includes software including frequency control application 308 as well as node frequency 310, node operating parameters 312, generator node parameters 314, and load node parameters 316. A node can measure node frequency through the I/O interface and/or receive this value from a centralized computer. The frequency control application 308 will be discussed in greater detail below and can enable the node to perform calculations to solve for optimal frequency control in a distributed manner. These distributed calculations can be performed such that only node operating parameters 312 and node frequency 310 need to be known by the node, and no communication with other nodes or knowledge of system parameters are required.

Node operating parameters will be discussed in detail below but may include (but are not limited to) a cost function, a utility function, and/or bounds of control variables. Distributed calculations will generate generator node parameters 314 in the case of a generator node and load node parameters 316 in the case of a load node. In various embodiments, the same node controller can be used for both generator and load nodes. It should be readily apparent node controller 300 can be adapted to generator node or load node specific applications, or a hybrid controller that can switch between specific node types as requirements of specific applications require. Although a number of different node controller implementations are discussed above with reference to FIG. 3, any of a variety of computing systems can be utilized to control a node within a power distribution system as appropriate to the requirements of specific applications in accordance with various embodiments of the invention. Graph representations of a power distribution network in accordance with several embodiments of the invention are discussed further below.

Power Network Graph Representations

In various embodiments, the following graph representation is utilized to represent at least a portion of a power distribution network. Let $\mathbb{R}$ denote the set of real numbers. For a set $\mathcal{N}$, let $|\mathcal{N}|$ denote its cardinality. A variable without a subscript usually denotes a vector with appropriate components, e.g., $\omega=(\omega_j, j\in\mathcal{N})\in\mathbb{R}^{|\mathcal{N}|}$. For a, b $\in\mathbb{R}$, a≤b, the expression $[\bullet]_a^b$ denotes max $\{\min(\{\bullet, b\}, a\}$. For a matrix A, $A^T$ can denote its transpose. For a square matrix A, the expression $A\succ 0$ indicates it is positive definite and $A\prec 0$ indicates the matrix is negative definite. For a signal $\omega(t)$ of time t, let $\dot\omega$ denote its time derivative $d\omega/dt$.

The classical structure preserving model can be combined with generator speed governor and turbine models. The power network is modeled as a graph $(\mathcal{N}, \varepsilon)$ where $\mathcal{N}=\{1, \ldots, |\mathcal{N}|\}$ is the set of nodes (buses) and $\varepsilon\subseteq\mathcal{N}\times\mathcal{N}$ is the set of lines connecting those nodes (buses). The line connecting nodes (buses) i, j$\in\mathcal{N}$ can be denoted by (i, j), and in several embodiments it can be assumed that (N, $\varepsilon$) is directed, with an arbitrary orientation, so that if (i, j)$\in\varepsilon$ then (j, i)$\notin\varepsilon$. "i:i→j" and "k:j→k" can respectively be used to denote the set of nodes (buses) i that are predecessors of node (bus) j and the set of nodes (buses) k that are successors of node (bus) j. In many embodiments, it can be assumed without loss of generality that (N, $\varepsilon$) is connected, and the following assumptions can be utilized: lines (i, j)$\in\varepsilon$ are lossless and characterized by their reactances $x_{ij}$, voltage magnitudes $|V_j|$ of nodes (buses) j$\in\mathcal{N}$ are constants, and reactive power injections on nodes (buses and reactive power flows on lines are not considered.

A subset $\mathcal{G}\subset\mathcal{N}$ of the nodes (buses) are fictitious nodes (buses) representing the internal of generators. Hence, the set $\mathcal{G}$ can be called the set of generators and the set $\mathcal{L}=\mathcal{N}\setminus\mathcal{G}$ can be the set of load nodes (buses). All the nodes (buses) in $\mathcal{L}$ can be called load nodes (buses) without distinguishing between generator nodes (buses) (nodes connected directly to generators) and actual load nodes (buses), since they can be treated in the same way mathematically. The nodes (buses) can be labeled so that $\mathcal{G}=\{1, \ldots, |\mathcal{G}|\}$ and $\mathcal{L}=\{|\mathcal{G}|+1, \ldots, |\mathcal{N}|\}$.

The voltage phase angle of node (bus) j$\in\mathcal{N}$, with respect to the rotating framework of nominal frequency $\omega_0=120\pi$ rad/s, can be denoted by $\theta_j$. The frequency deviation of node (bus) j from the nominal frequency $\omega_0$ can be denoted by $\omega_j$. Hence $$\dot\theta_j=\omega_j j\in\mathcal{N}. \qquad (1)$$

The system dynamics are described by the swing equations $$M_j\dot\omega_j=-D_j\omega_j+p_j-F_j(\theta)j\in\mathcal{N} \qquad (2)$$

where $M_j>0$ for j$\in\mathcal{G}$ are moments of inertia of generators and $M_j=0$ for j$\in\mathcal{L}$, and $D_j>0$ for all j$\in\mathcal{N}$ are (for j$\in\mathcal{G}$) the damping coefficients of generators or (for j$\in\mathcal{L}$) the coefficients of linear frequency dependent loads, e.g., induction motors. The variable $p_j$ denotes the real power injection to node (bus) j, which is the mechanic power injection to generator if j$\in\mathcal{G}$, and is the negative of real power load if j$\in\mathcal{L}$. The net real power flow out of node (bus) j is $$F_j(\theta):=\sum_{k:j\to k} Y_{jk}\sin(\theta_j-\theta_k)-\sum_{i:i\to j} Y_{ij}\sin(\theta_i-\theta_j) \quad j\in\mathcal{N} \qquad (3)$$

where $$Y_{jk}:=\frac{|V_j||V_k|}{x_{jk}}$$

are the maximum real power flows on lines (j, k)$\in\varepsilon$.

In various embodiments, a system of governor and turbine can be associated with a generator j$\in\mathcal{G}$, and their dynamics can be described by $$\dot a_j=-\frac{1}{\tau_{g,j}}a_j+\frac{1}{\tau_{g,j}}p_j^c \quad j\in\mathcal{G} \qquad (4)$$

$$\dot p_j=-\frac{1}{\tau_{b,j}}p_j+\frac{1}{\tau_{b,j}}a_j \quad j\in\mathcal{G} \qquad (5)$$

where $a_j$ is the valve position of the turbine, $p_j^c$ is the control command to the generator, and $p_j$, as introduced above, is the mechanic power injection to the generator. The time constants $\tau_{g,j}$ and $\tau_{b,j}$ characterize respectively the time-delay in governor action and the approximated fluid dynamics in the turbine. Traditionally, there is a frequency feedback term $$-\frac{1}{R_j}\omega_j$$

added to the right-handside of (4), known as the frequency droop control. Here this term is merged into $p_j^c$ to allow for a general form of frequency feedback control.

Equations (1)-(5) specify a dynamical system with state variables (θ, ω, $a^{\mathcal{G}}$, $p^{\mathcal{G}}$) where $$\theta := \{\theta_1, \ldots, \theta_{|\mathcal{N}|}\}, \omega := \{\omega_1, \ldots, \omega_{|\mathcal{N}|}\}$$

$$a^{\mathcal{G}} := \{a_1, \ldots, a_{|\mathcal{G}|}\}, p^{\mathcal{G}} := \{p_1, \ldots, p_{|\mathcal{G}|}\}$$

and input variables ($p_{\mathcal{G}}^c$, $p_{\mathcal{L}}$) where $$p_{\mathcal{G}}^c := \{p_1^c, \ldots, p_{|\mathcal{G}|}^c\}, p_{\mathcal{L}} := \{p_{|\mathcal{G}|+1}, \ldots, p_{|\mathcal{N}|}\}.$$

($p_{\mathcal{G}}^c$, $p_{\mathcal{L}}$) are feedback control to be designed based on local measurements of frequency deviations, i.e., ($p_{\mathcal{G}}^c(\omega)$, $p_{\mathcal{L}}(\omega)$). Parameters $\underline{p}_j \leq \overline{p}_j$ specify the bounds of the control variables, i.e., $\underline{p}_j \leq p_j^c(\omega) \leq \overline{p}_j$ for $j \in \mathcal{G}$, and $\underline{p}_j \leq p_j(\omega) \leq \overline{p}_j$ for $j \in \mathcal{L}$. Note that if $\underline{p}_j = \overline{p}_j$ then they specify a constant, uncontrollable input on node (bus) j. This can create a closed-loop dynamical system, and equilibrium points for this system will be described below.

Equilibrium Points

Definition 1. An equilibrium point of the system (1)-(5) with control ($p_{\mathcal{G}}^c(\omega)$, $p_{\mathcal{L}}(\omega)$), (referred to as a closed-loop equilibrium for short), is (θ*, ω, $a_{\mathcal{G}}^*$, $p_{\mathcal{G}}^*$, $p_{\mathcal{G}}^{c,*}$, $p_{\mathcal{L}}^*$), where θ* is a vector function of time and (ω*, $a_{\mathcal{G}}^*$, $p_{\mathcal{G}}^*$, $p_{\mathcal{G}}^{c,*}$, $p_{\mathcal{L}}^*$) are vectors of real numbers, such that $$p_{\mathcal{G}}^{c,*} = p_{\mathcal{G}}^c(\omega^*), p_{\mathcal{L}}^* = p_{\mathcal{L}}(\omega^*) \quad (6)$$

$$d\theta_j^*/dt = \omega_j^* \; j \in \mathcal{N} \quad (7)$$

$$\omega_i^* = \omega_j^* = \omega^* \; i, j \in \mathcal{N} \quad (8)$$

$$-D_j \omega_j^* + p_j^* - F_j(\theta^*) = 0 \; j \in \mathcal{N} \quad (9)$$

$$p_j^* = a_j^* = p_j^{c,*} \; j \in \mathcal{G}. \quad (10)$$

Notation can be abused by using ω* to denote both the vector (ω*$_1$, ..., $\omega_{|\mathcal{N}|}^*$) and the common value of its components. Its meaning should be clear from the context.

In the definition above, (8) ensures constant F(θ*) at equilibrium points by (3), and (9)(10) are obtained by letting right-hand-sides of (2)(4)(5) be zero. From (8), at any equilibrium point, all the nodes (buses) are synchronized to the same frequency. The system typically has multiple equilibrium points as will be explained in detail below. An equilibrium point can also be written as (θ*, ω*, $a_{\mathcal{G}}^*$, $p_{\mathcal{G}}^{c,*}$, p*) where p*:=($p_{\mathcal{G}}^*$, $p_{\mathcal{L}}^*$), when state variables $p_{\mathcal{G}}^*$ and control variables $p_{\mathcal{L}}^*$ do not need to be distinguished.

Decentralized Primary Frequency Control

An initial point of the dynamical system (1)-(5) corresponds to the state of the system at the time of fault-clearance after a contingency, or the time at which an unscheduled change in power injection occurs during normal operation. In either case, the system trajectory, driven by primary frequency control ($p_{\mathcal{G}}^c(\omega)$, $p_{\mathcal{L}}(\omega)$), converges to a desired equilibrium point. The criteria for desired equilibrium points can be formalized by formulating an optimization problem called optimal frequency control (OFC), and using OFC to guide the design of control processes for various components within a power distribution network.

Optimal Frequency Control Problem

In several embodiments, the objective in the power distribution network can be to rebalance power after a disturbance at a minimum generation cost and user disutility. This can be formalized by requiring any closed-loop equilibrium (p*, d*) to be a solution of the following OFC problem, where $d_j = D_j \omega_j^*$ for $j \in \mathcal{N}$.

$$\min_{p,d} \sum_{j \in N} \left( c_j(p_j) + \frac{1}{2D_j} d_j^2 \right) \quad (11)$$

$$\text{subject to} \sum_{j \in N} (p_j - d_j) = 0 \quad (12)$$

$$\underline{p}_j \leq p_j \leq \overline{p}_j \quad j \in \mathcal{N}. \quad (13)$$

The term $c_j(p_j)$ in objective function (11) is generation cost (if $j \in \mathcal{G}$) or user disutility for participating in load control (if $j \in \mathcal{L}$). For simplicity $c_j$ can be called a cost function for $j \in \mathcal{N}$ even if it may be a user disutility function. The term $$\frac{1}{2D_j} d_j^2$$

implicitly penalizes frequency deviation on node (bus) j at equilibrium. The constraint (12) can ensure power balance over an entire network, and (13) can be bounds on power injections. These bounds can be determined by control capacities of generators or controllable loads, as well as uncontrollable power injections as an exogenous input.

In many embodiments, the following assumptions can be utilized:

Condition 1. OFC is feasible. The cost functions $c_j$ are strictly convex and twice continuously differentiable on ($\underline{p}_j$, $\overline{p}_j$).

Remark 1. A load $-p_j$ on node (bus) $j \in \mathcal{L}$ results in a user utility $u_j(-p_j)$, and hence the disutility function can be defined as $c_j(p_j) = -u_j(-p_j)$. The user disutility functions or generation cost functions usually satisfy Condition 1, and in many cases are quadratic functions.

Condition 2. For any optimal solution (p*, d*) of OFC, the power flow equations $$F_j(\theta) = p_j^* - d_j^* \; j \in \mathcal{N} \quad (14)$$

are feasible, i.e., have at least one solution $\theta^* \in \mathbb{R}^{|\mathcal{N}|}$.

Remark 2. Condition 2 ensures the existence of a closed-loop equilibrium of the dynamical system (1)-(5) with the feedback control described below.

Design of Decentralized Feedback Control

Figure 4:
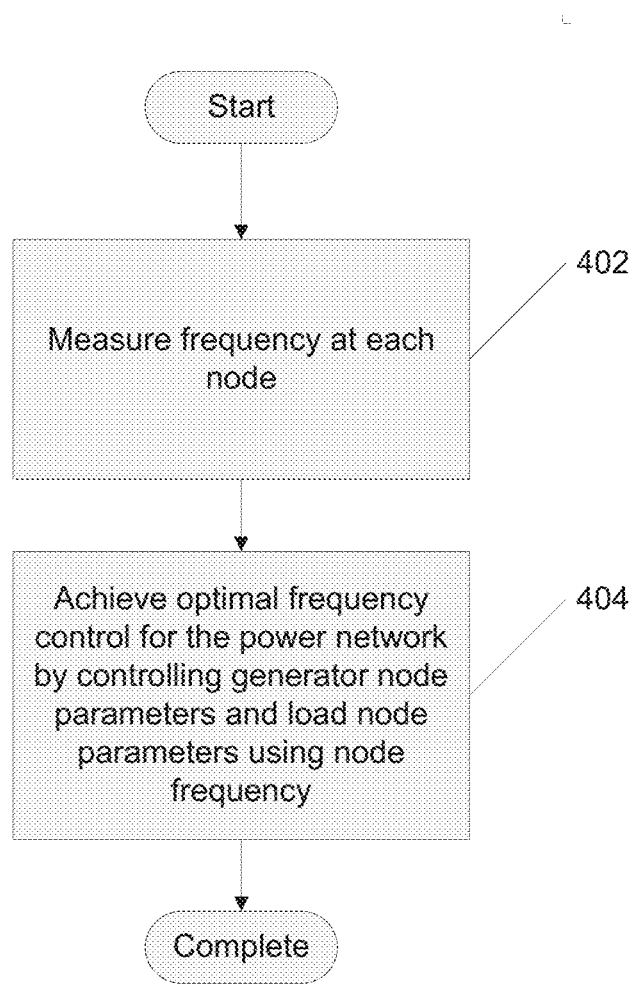
FIG. 4 is a flow chart illustrating a process to solve for optimal frequency control in a power distribution network in accordance with an embodiment of the invention.

An overview of a process for solving for optimal frequency control in a power distribution network is illustrated in FIG. 4. In process 400, the frequency of each node is measured 402. Optimal frequency control is achieved 404 for the power network by controlling generator node parameters and load node parameters using the measured node frequency.

Figure 5:
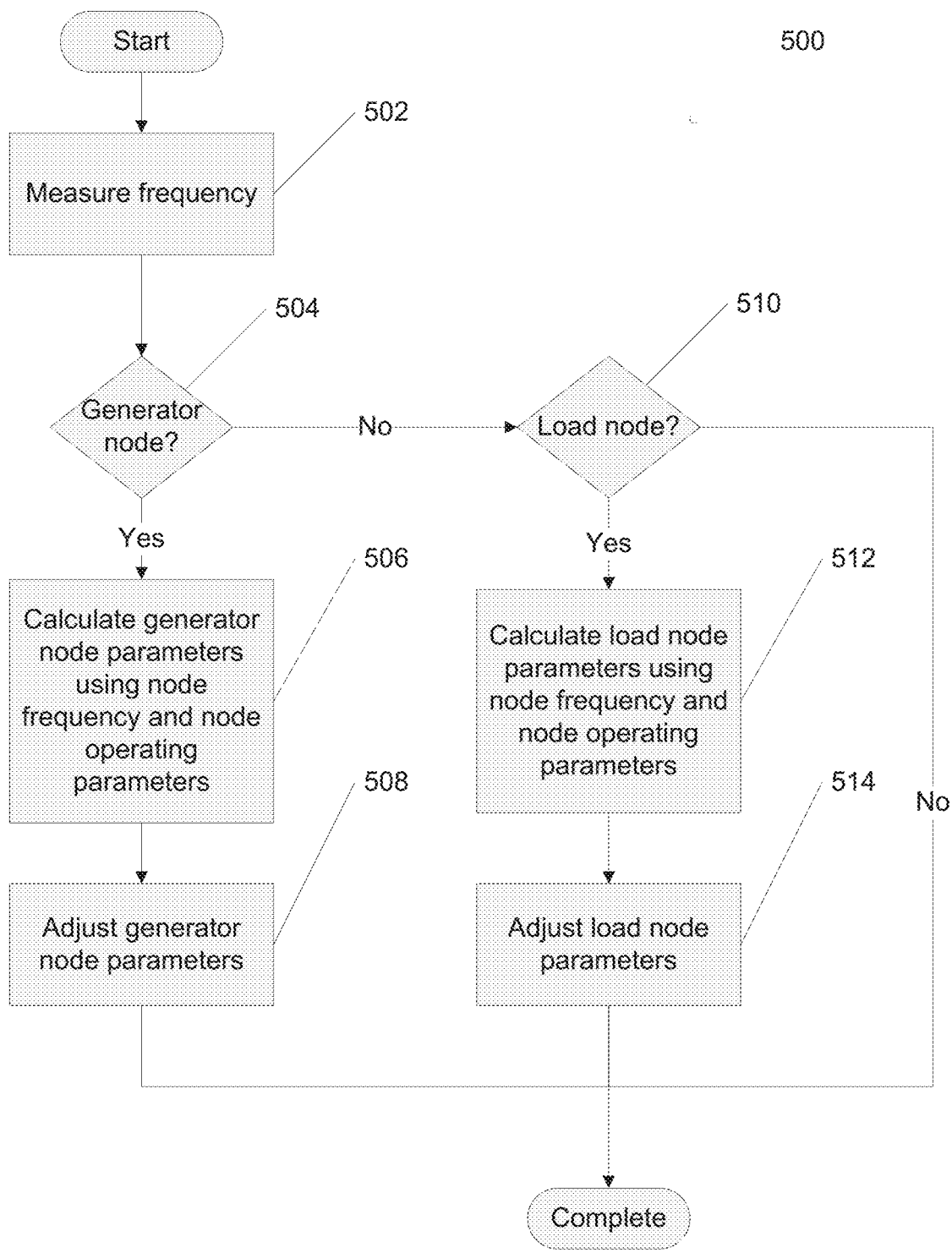
FIG. 5 is a flow chart illustrating a process to adjust generator and load parameters in accordance with an embodiment of the invention.

A process for a node to adjust generator node parameters and/or load node parameters is illustrated in FIG. 5. Referring above to FIG. 3 and FIG. 4, the process can be similar to parts of process 400 and can be performed by a node controller similar to node controller 300. Process 500 includes measuring 502 frequency of the node. If the node is a generator node 504, generator node parameters are calculated 506 using the node frequency and node operating parameters. Generator node parameters are adjusted 508 and the process completes. If the node is not a generator node 504, and is a load node 510, load node parameters are calculated 512 using the node frequency and node operating parameters. Load node parameters are adjusted 514 and the process completes. If the load is neither a generator node 504 nor a load node 510, the process completes. This process will be described in detail below.

As noted above, OFC can be used to guide controller design. In various embodiments, ($p_{\mathcal{G}}^c(\omega)$, $p_{\mathcal{L}}(\omega)$) can be designed as $$p_j^c(\omega_j) = [(c_j')^{-1}(-\omega_j)]_{\underline{p}_j}^{\overline{p}_j} \quad j \in \mathcal{G} \quad (15)$$

$$p_j(\omega_j) = [(c_j')^{-1}(-\omega_j)]_{\underline{p}_j}^{\overline{p}_j} \quad j \in \mathcal{L}. \quad (16)$$

The function $(c_j')^{-1}(\bullet)$, which is the inverse function of the derivative of the cost function, is well defined if Condition 1 holds. Note that this control is completely decentralized in that for every generator and load indexed by j, the control decision is a function of frequency deviation $\omega_j$ measured at its local node (bus). Only its own cost function $c_j$ and bounds $[\underline{p}_j, \overline{p}_j]$ need to be known. No explicit communication with other generators and loads is required, nor is any knowledge of system parameters. Moreover, the following theorem shows that this design fulfills OFC objectives.

Figure 6:
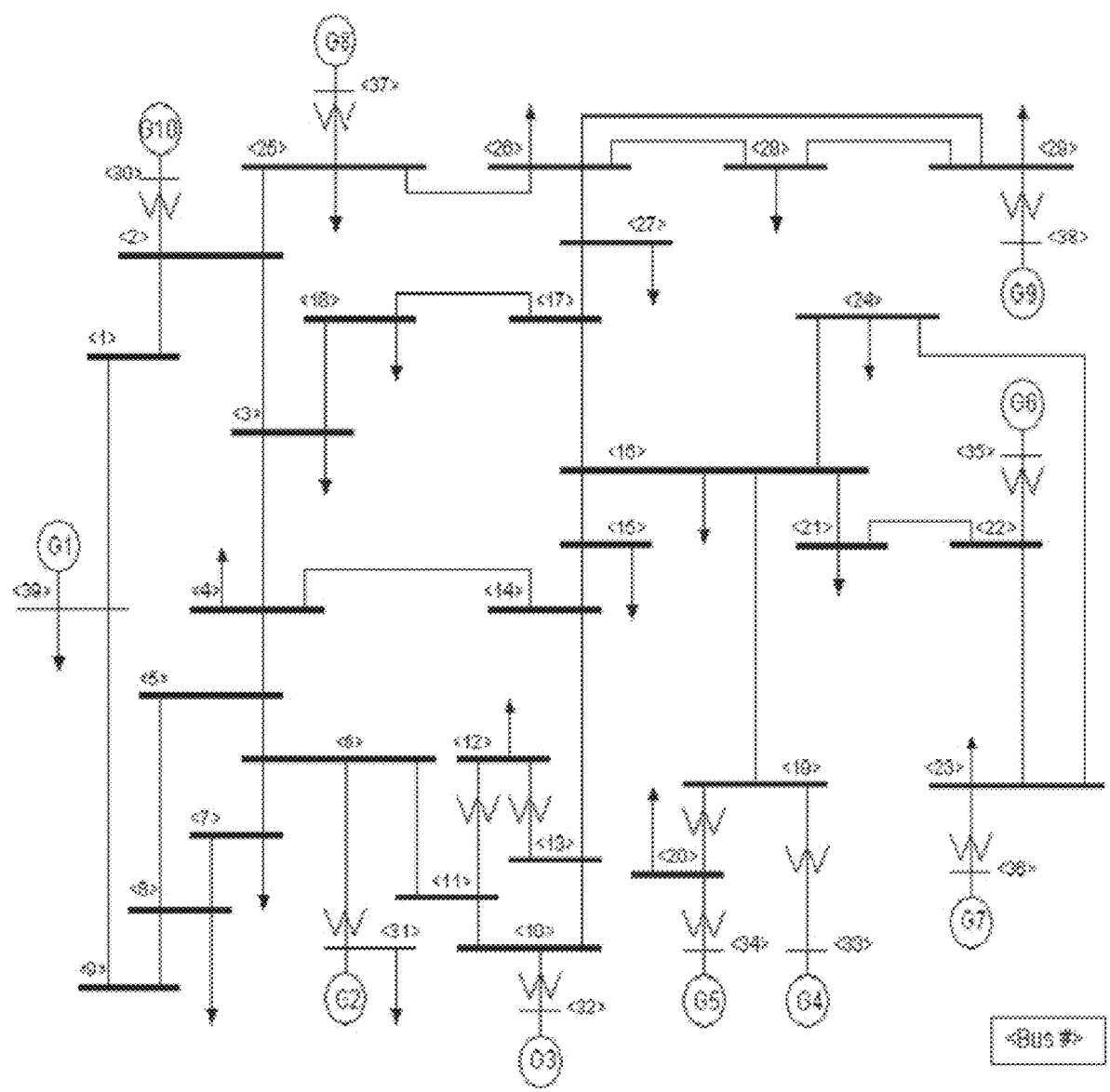
FIG. 6 is a diagram illustrating an IEEE New England test system for simulations in accordance with an embodiment of the invention.

Theorem 1. Suppose Conditions 1 and 2 hold, it can be proven that:
1. There is a unique optimal solution of OFC and its dual.
2. For the system (1)-(5) with control (48)(48), there exists at least one equilibrium point. Let ($\theta^*$, $\omega^*$, $a^{*\mathcal{G}}$, $p^{\mathcal{G}\,c,*}$, $p^*$) be any of its equilibrium point(s). Then ($p^*$, $d^*$; $\omega^*$) is the unique optimal solution of OFC and its dual, where $d_j^* = D_j\omega^*$ for $j \in \mathcal{N}$ Optimal Frequency Control Simulations The performance of the proposed control can be illustrated through a simulation of the IEEE New England test system shown in FIG. 6. FIG. 6 illustrates an IEEE New England Test system. This system has 10 generators and 39 nodes (buses), and a total load of about 60 per unit (pu) where 1 pu represents 100 MVA. Compared to the model (2)-(4), the simulation model is more detailed and realistic, with transient generator dynamics, excitation and flux decay dynamics, changes in voltage and reactive power over time, and lossy transmission lines, et cetera. The test system in FIG. 6 is similar to the test system described below with respect to in FIG. 11.

The primary frequency control of generator or load j is designed with cost function $$c_j(p_j) = \frac{R_j}{2}(p_j - p_j^{set})^2,$$

where $p_j^{set}$ is the power injection at the setpoint, an initial equilibrium point solved from static power flow problem. By choosing this cost function, the deviations of power injections from the setpoint can be attempted to be minimized, and have the control $$p_j = \left[ p_j^{set} - \frac{1}{R_j}\omega_j \right]_{\underline{p}_j}^{\overline{p}_j}$$

from (48)(48). Only the load control $p_j$ for $j \in \mathcal{L}$ is written since the generator control $p_j^c$ for $j \in \mathcal{G}$ takes the same form. The following two simulated cases can be considered in which the generators and loads have different control capabilities and hence different $[\underline{p}_j, \overline{p}_j]$:

1. All the 10 generators have $[\underline{p}_j, \overline{p}_j] = [p_j^{set}(1-c), p_j^{set}(1+c)]$, and all the loads are uncontrollable;
2. Generators 2, 4, 6, 8, 10 (which happen to provide half of the total generation) have the same bounds as in case (1). Generators 1, 3, 5, 7, 9 are uncontrollable, and all the loads have $[\underline{p}_j, \dot{p}_j] = [p_j^{set}(1+c/2), p_j^{set}(1-c/2)]$, if $p_j^{set} \leq 0$ for loads $j \in \mathcal{L}$.

Hence simulated cases (1) and (2) have the same total control capacity across the network. Case (1) only has generator control while in case (2) the set of generators and the set of loads each has half of the total control capacity. c=10% can be selected, which implies the total control capacity is about 6 pu. For all $j \in \mathcal{N}$, the feedback gain $1/R_j$ is selected as 25 $p_j^{set}$, which is a typical value in practice meaning a frequency change of 0.04 pu (2.4 Hz) causes the change of power injection from zero all the way to the setpoint. Note that this control is the same as frequency droop control, which implies that indeed frequency droop control implicitly solves an OFC problem with quadratic cost functions used here. However, the simulated controller design can be more flexible by allowing a larger set of cost functions.

Figure 7:
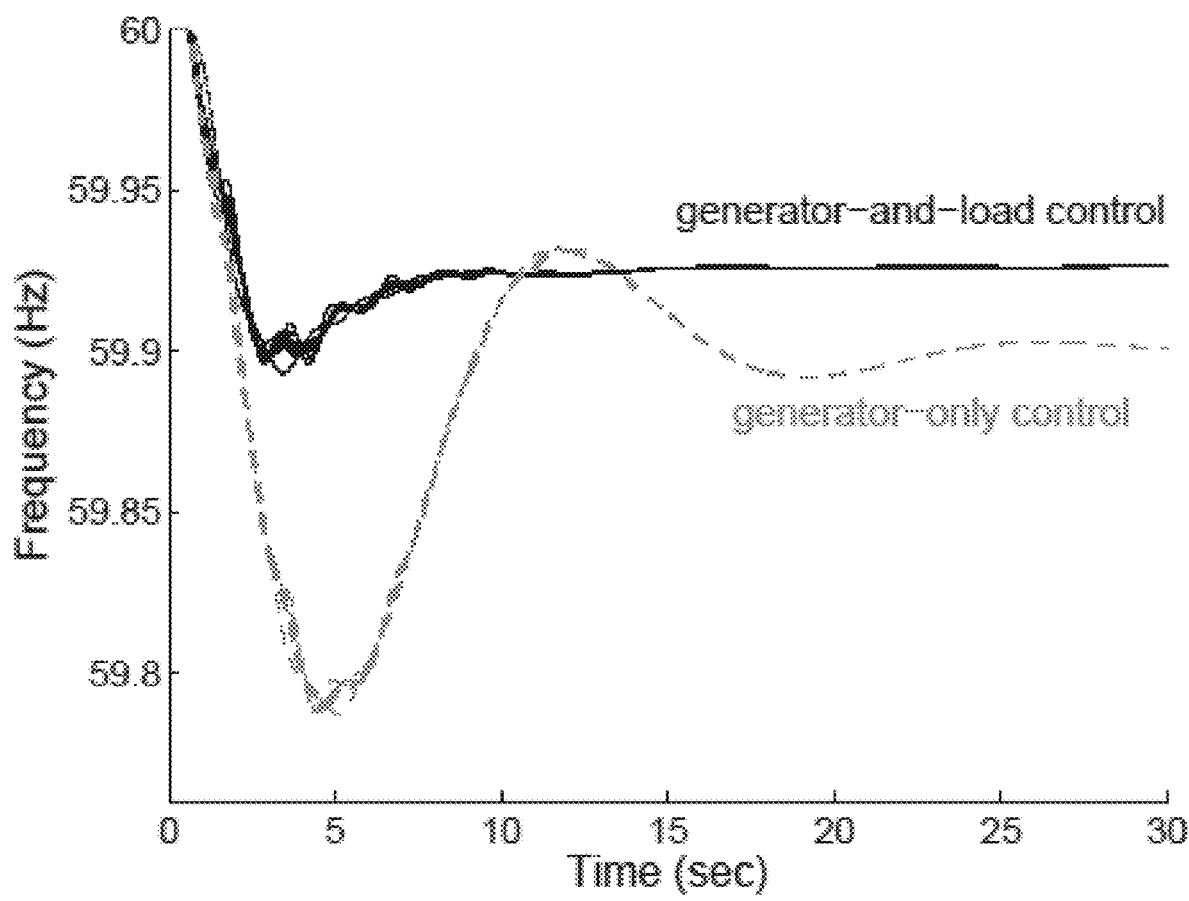
FIG. 7 is a diagram illustrating generator frequencies in a simulated optimal frequency control processes in accordance with an embodiment of the invention.

In several embodiments, the simulated system is initially at the setpoint with 60 Hz frequency. At time t=0.5 second, nodes (buses) 4, 15, 16 each makes 1 pu step change in their real power consumptions, causing the frequency to drop. FIG. 7 illustrates the frequencies of all the 10 generators under case (1) only generators are controlled (red) and case (2) both generators and loads are controlled (black). The total control capacities are the same in these two cases. It can be seen in both cases that frequencies of different generators have relatively small differences during transient, and are synchronized towards the new steady-state frequency. Compared with simulated generator-only control, the combined simulated generator-and-load control improves both the transient and steady-state frequency, even though the total control capacities in both cases are the same.

In contrast to the optimal frequency problem discussed above in SECTION 1, a similar optimization problem, the optimal load problem is discussed below in SECTION 2.

Section 2

Node Controllers for Optimal Load Control

Figure 8:
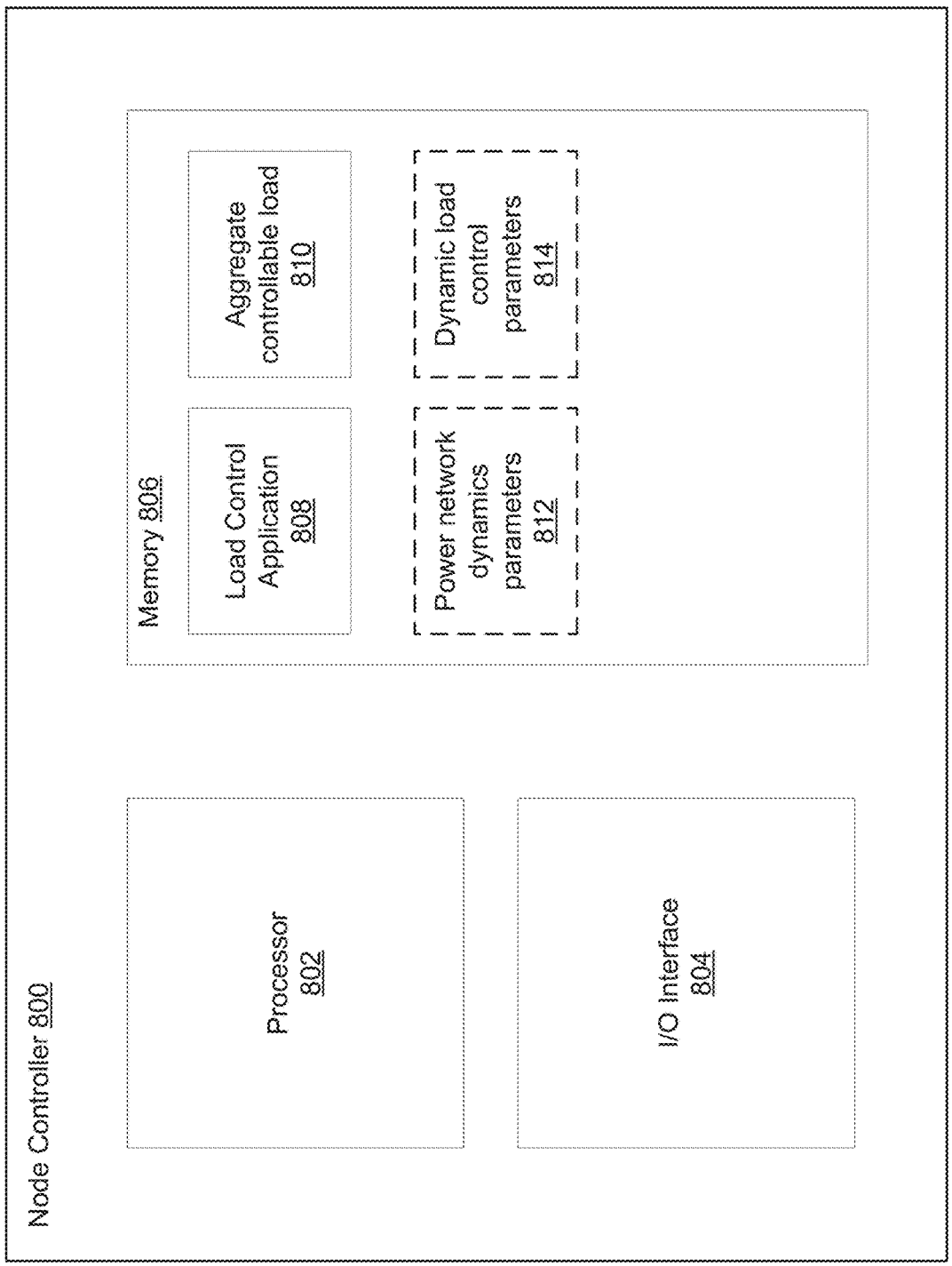
FIG. 8 is a block diagram illustrating a node controller for optimal load control in accordance with an embodiment of the invention.

A node controller in accordance with an embodiment of the invention is shown in FIG. 8. In many embodiments, node controller 800 can perform calculations at a node in a power distribution network in a manner similar to the node controller described above with respect to FIG. 3. The node controller includes at least one processor 802, an I/O interface 804, and memory 806. The at least one processor 802, when configured by software stored in memory, can perform calculations on and make changes to data passing through the I/O interface as well as to data stored in memory. In many embodiments, the memory 806 includes software including load control application 808 as well as aggregate controllable load 810, power network dynamics parameters 812, and dynamic load control parameters 814. The load control application 808 will be discussed in greater detail below and can enable the node to perform calculations to solve for optimal load control subject to line flow limits. These calculations can be performed such that power network dynamics parameters 812 and dynamic load control parameters 814 (both to be discussed in detail below) can be used together to calculate the aggregate controllable load. Although a variety of node controllers are described above with reference to FIG. 8, any of a variety of computing systems can be utilized to control a node within a power distribution system as appropriate to the requirements of specific applications in accordance with various embodiments of the invention.

Power Network Graph Representations for OLC

In many embodiments, the following graph representation is utilized to represent at least a portion of a power distribution network. While largely similar to the graph representation used above in SECTION 1, it should be noted that SECTION 2 uses different notations. $\mathbb{R}$ can be the set of real numbers and $\mathbb{N}$ can be the set of natural numbers. Given a finite set $S \subset \mathbb{N}$, $|S|$ to denotes its cardinality. For a set of scalar numbers $a_i \in \mathbb{R}$, $i \in S$, $a_S$ can be the column vector of the $a_i$ components, i.e. $a_S := (a_i, \in S) \in \mathbb{R}^{|S|}$; the subscript S is typically dropped when the set is known from the context. Similarly, for two vectors $a \in \mathbb{R}^{|S|}$ and $b \in \mathbb{R}^{|S'|}$ the column vector x can be defined as $x=(a,b) \in \mathbb{R}^{|S|+|S'|}$. Given any matrix A, its transpose can be denoted as $A^T$ and the ith row of A can be denoted as $A_i$. $A_S$ can be used to denote the sub matrix of A composed only of the rows $A_i$ with $i \in S$. The diagonal matrix of a sequence $\{a_i, i \in S\}$, is represented by $\text{diag}(a_i)_{i \in S}$. Similarly, for a sequence of matrices $\{A_h, h \in S\}$, blockdiag$(A_h)_{h \in S}$ can denote the block diagonal matrix. Finally, 1 (0) can be used to denote the vector/matrix of all ones (zeros), where its dimension can be understood from the context.

A power distribution network described by a directed graph $G(\mathcal{N}, \varepsilon)$ where $\mathcal{N} = \{1, \ldots, |\mathcal{N}|\}$ is the set of nodes (buses) and $\varepsilon \subset \mathcal{N} \times \mathcal{N}$ is the set of transmission lines denoted by either e or ij such that if $ij \in \varepsilon$, then $ji \notin \varepsilon$.

The nodes (buses) can be partitioned $\mathcal{N} = \mathcal{G} \cup \mathcal{L}$ and $\mathcal{G}$ and $\mathcal{L}$ to indicate the set of generator and load nodes (buses) respectively. In many embodiments it can be assumed that the graph $(\mathcal{N}, \varepsilon)$ is connected, and additionally the following assumptions can be made which are well-justified for transmission networks: Node (bus) voltage magnitudes $|V_j|=1$ pu for $j \in \mathcal{N}$. Lines $ij \in \varepsilon$ are lossless and characterized by their susceptances $B_{ij} = B_{ji} > 0$. The analysis can be extended to networks with constant R/X ratio. Reactive power flows do not affect node (bus) voltage phase angles and frequencies.

In various embodiments, it can be further assumed that the node (bus) frequency $\omega_i$ and line flows $P_{ij}$ are close to schedule values $\omega^0$ and $P_{ij}^0$. In other words, $P_{ij} = P_{ij}^0 + \delta P_{ij}$ and $\omega_i = \omega_0 + \delta \omega_i$ with $\delta P_{ij}$ and $\delta \omega_i$ small enough; without loss of generality, take $\omega_0 = 0$. The evolution of the transmission network is then described by $$M_i \dot{\omega}_i = P_i^m - (d_i + \hat{d}_i) - \sum_{e \in \varepsilon} C_{i,e} P_e \quad i \in \mathcal{G} \quad (17a)$$

$$0 = P_i^m - (d_i + \hat{d}_i) - \sum_{e \in \varepsilon} C_{i,e} P_e \quad i \in \mathcal{L} \quad (17b)$$

$$\dot{P}_{ij} = B_{ij}(\omega_i - \omega_j) \quad i \in \varepsilon \quad (17c)$$

$$\hat{d}_i = D_i \omega_i \quad i \in \mathcal{N} \quad (17d)$$

where $d_i$ denotes an aggregate controllable load, $\hat{d}_i = D_i \omega_i$ denotes an aggregate uncontrollable but frequency-sensitive load as well as damping loss at generator i, $M_i$ is the generator's inertia, $P_i^m$ is the mechanical power injected by a generator $i \in \mathcal{G}$, and $-P_i^m$ is the aggregate power consumed by constant loads for $i \in \mathcal{L}$. Finally, $C_{i,e}$ are the elements of the incidence matrix $C \in \mathbb{R}^{|\mathcal{N}| \times |\varepsilon|}$ of the graph $G(\mathcal{N}, \varepsilon)$ such that $C_{i,e} = -1$ if $e = ji \in \varepsilon$, $C_{i,e} = 1$ if $e = ij \in \varepsilon$ and $C_{i,e} = 0$ otherwise.

For notational convenience the vector for can be used whenever needed of (17), i.e.

$$M_\mathcal{G} \dot{\omega}_\mathcal{G} = P_\mathcal{G}^m - (d_\mathcal{G} + \hat{d}_\mathcal{G}) - C_\mathcal{G} P$$

$$0 = P_\mathcal{L}^m - (d_\mathcal{L} + \hat{d}_\mathcal{L}) - C_\mathcal{L} P$$

$$\dot{P} = D_B C^T \omega$$

$$\hat{d} = D \omega$$

where the matrices $C_\mathcal{L}$ and $C_\mathcal{G}$ by splitting the rows of C between generator and load nodes (buses), i.e. $C = [C_\mathcal{G}^T \ C_\mathcal{L}^T]^T$, $D = \text{diag}(D_i)_{i \in \mathcal{N}}$, $D_B = \text{diag}(B_{ij})_{ij \in \varepsilon}$ and $M_\mathcal{G} = \text{diag}(M_i)_{i \in \mathcal{G}}$.

Operational Constraints for OLC

Each control area can be indicated using k and $\mathcal{K} = \{1, \ldots, |\mathcal{K}|\}$ can indicate the set of areas. Within each area, the Automatic Generation Control (AGC) scheme seeks to restore the frequency to its nominal value as well as preserving a constant power transfer outside the area, i.e.

$$\sum_{i \in \mathcal{N}_k} \sum_{e \in \varepsilon} C_{i,e} P_e = e_k^T CP = \hat{P}_k, \quad \forall k \in \mathcal{K}, \quad (18)$$

where $\mathcal{N}_k \subset \mathcal{N}$ is the set of nodes (buses) of area $k \in \mathcal{K}$, $e_k \in \mathbb{R}^{|\mathcal{N}|}$, $k \in \mathcal{K}$, is a vector with elements $(e_k)_i = 1$ if $i \in \mathcal{N}_k$ and $(e_k)_i = 0$ otherwise, $\hat{P}_k$ is the net scheduled power injection of area k.

In many embodiments, it can be shown that $$\hat{C} := E_\mathcal{K} C \quad (19)$$

with $E_\mathcal{K} := [e_1 \ldots e_{|\mathcal{K}|}]^T$ and $\hat{C} \in \mathbb{R}^{|\mathcal{K}| \times |\varepsilon|}$, then constraint (18) can be compactly expressed using $$\hat{C} P = \hat{P} \quad (20)$$

where $\hat{P} = (\hat{P}_k)_{k \in \mathcal{K}} \in \mathbb{R}^{|\mathcal{K}|}$. It is easy to see that $\hat{C}_{k,e}(e=ij)$ is equal to 1 if ij is an inter-area line with $i \in \mathcal{N}_k$, $-1$ if ij is an inter-area line with $j \in \mathcal{N}_k$, and 0 otherwise.

Finally, the thermal limit constraints are usually given by $$\underline{P} \leq P \leq \overline{P} \quad (21)$$

where $\overline{P} := (\overline{P}_e)_{e \in \varepsilon}$ and $\underline{P} := (\underline{P}_e)_{e \in \varepsilon}$ represent the line flow limits, usually $\underline{P} = -\overline{P}$ so that $|P| \leq \overline{P}$.

Efficient Load Control

Suppose the system (17) is in equilibrium, i.e. $\dot{\omega}_i = 0$ for all i and $\dot{P}_{ij} = 0$ for all ij, and at time 0, there is a disturbance, represented by a step change in the vector $P^m := (P_i^m, i \in \mathcal{N})$, that produces a power imbalance. Then, in various embodiments, a distributed control mechanism can rebalance the system while preserving the frequency within its nominal value as well as maintaining the operational constraints described above. Furthermore, in some embodiments this mechanism can produce an efficient allocation among all the users (or loads) that are willing to adapt.

$c_i(d_i)$ and $$\frac{\hat{d}^2}{2D_i}$$

can denote the cost or disutility of changing the load consumption by $d_i$ and $\hat{d}_i$ respectively, which describes efficiency in terms of the loads' welfare. More precisely, a load control (d, d̂) is efficient if it solves the following problem.

Problem 1 (WELFARE)

$$\underset{d,\hat{d}}{\text{minimize}} \quad \sum_{i \in \mathcal{N}} c_i(d_i) + \frac{\hat{d}_i^2}{2D_i}. \tag{22}$$

subject to operational constraints.

This can balance supply and demand, i.e.

$$\sum_{i \in \mathcal{N}} (d_i + \hat{d}_i) = \sum_{i \in \mathcal{N}} P_i^m. \tag{23}$$

It is shown that when $$d_i = c_i'^{-1}(\omega_i), \tag{24}$$

then (17) is a distributed primal-dual algorithm that solves (22) subject to (23).

Therefore, problem (22)-(23) can be used to forward engineering the desired node controllers, by means of primal-dual decomposition, that can rebalance supply and demand. Like primary frequency control, the system (17) and (24) suffers from the disadvantage that the optimal solution of (22)-(23) may not recover the frequency to the nominal value and satisfy the additional operational constraints described above.

A clever modification of (22)-(23) can restore the nominal frequency while maintaining the interpretation of (17) as a component of the primal-dual algorithm that solves the modified optimization problem. An additional byproduct of the formulation is that any type of linear equality and inequality constraint that the operator may require can be imposed.

Optimal Load-side Control

The crux of a solution in various embodiments comes from including additional constraints to Problem 1 that implicitly guarantee the desired operational constraints, yet still preserves the desired structure which allows the use of (17) as part of the optimization algorithm.

Thus in several embodiments, the following modified version of Problem 1 can be used:

Problem 2 (OLC)

$$\underset{d,\hat{d},P,v}{\text{minimize}} \quad \sum_{i \in \mathcal{N}} c_i(d_i) + \frac{\hat{d}_i^2}{2D_i}. \tag{25a}$$

subject to $$P^m - (d + \hat{d}) = CP \tag{25b}$$

$$P^m - d = L_B v \tag{25c}$$

$$\hat{C} D_B C^T v = \hat{P} \tag{25d}$$

$$\underline{P} \leq D_B C^T v \leq \overline{P} \tag{25e}$$

where $L_B := CD_B C^T$ is the $B_{ij}$-weighted Laplacian matrix.

Although not clear at first sight, the constraint (25c) implicitly enforces that any optimal solution of OLC (d*, d̂*, P*, v*) will restore the frequency to its nominal value, i.e.

d*$_i$=D$_i$ω*=0. Similarly, constraint (25d) can be used to impose (18) (or equivalently (20)) and (25e) to impose (21).

In various embodiments, the following assumptions can be utilized:

Assumption 1 (Cost function). The cost function $c_i(d_i)$ is α-strongly convex and second order continuously differentiable ($c_i \in C^2$ with $c''_i(d_i) \geq \alpha > 0$) in the interior of its domain $\mathcal{D}_i := [\underline{d}_i, \overline{d}_i] \subseteq \mathbb{R}$, such that $c_i(d_i) \to +\infty$ whenever $d_i \to \partial \mathcal{D}$.

Assumption 2 (Slater Condition). The OLC problem (25) is feasible and there is at least one feasible (d, d̂, P, v) such that $$d \in \text{Int } \mathcal{D} := \Pi_{i=1}^{|\mathcal{N}|} \mathcal{D}_i.$$

Properties of Optimal Solutions of OLC

The optimal solutions of OLC can have various properties. $v_i$, $\lambda_i$ and $\pi_k$ can be used as Lagrange multipliers of constraints (25b), (25c) and (25d), and $\rho_{ij}^+$ and $\rho_{ij}^-$ can be used as multipliers of the right and left constraints of (25e), respectively. In order to make the presentation more compact sometimes $x=(P, v) \in \mathbb{R}^{|\mathcal{E}|+|\mathcal{N}|}$ and $\sigma=(v, \lambda, \pi, \rho^+, \rho^-) \in \mathbb{R}^{2|\mathcal{N}|+|\mathcal{K}|+2|\mathcal{E}|}$, as well as $\sigma_i = (v_i, \lambda_i)$, $\sigma_k=(\pi_k)$ and $\sigma_{ij}=(\rho_{ij}^+, \rho_{ij}^-)$ can be used. $\rho:=(\rho^+, \rho^-)$ will also be used.

Next, the dual function D(σ) of the OLC problem can be considered.

$$D(\sigma) = \underset{d,\hat{d},x}{\inf} L(d, \hat{d}, x, \sigma) \tag{26}$$

where $$L(d, \hat{d}, x, \sigma) = \sum_{i \in \mathcal{N}} \left( c_i(d_i) + \frac{\hat{d}_i^2}{2D_i} \right) + v^T(P^m - (d + \hat{d}) - CP) + \tag{27}$$

$$\lambda^T(P^m - d - L_B v) + \pi^T(\hat{C} D_B C^T v - \hat{P}) +$$

$$\rho^{+T}(D_B C^T v - \overline{P}) + \rho^{-T}(\underline{P} - D_B C^T v)$$

$$= \sum_{i \in \mathcal{N}} \left( c_i(d_i) - (\lambda_i + v_i)d_i + \frac{\hat{d}_i^2}{2D_i} - v_i\hat{d}_i + \right.$$

$$(v_i + \lambda_i)P_i^m) - P^T C^T v - v^T(L_B \lambda - CD_B \hat{C}^T \pi -$$

$$CD_B(\rho^+ - \rho^-)) - \pi^T \hat{P} - \rho^{+T} \overline{P} + \rho^{-T} \underline{P}$$

Since $c_i(d_i)$ and $$\frac{\hat{d}_i^2}{2D_i}$$

are radially unbounded, the minimization over d and d̂ in (26) is always finite for given x and σ. However, whenever $C^T v \neq 0$ or $L_B \lambda - CD_B \hat{C}^T \pi - CD_B(\rho^+ - \rho^-) \neq 0$, P or v can be modified to arbitrarily decrease (27). Thus, the infimum is attained if and only if $$C^T v = 0 \text{ and} \tag{28a}$$

$$L_B \lambda - CD_B \hat{C}^T \pi - CD_B(\rho^+ - \rho^-) = 0. \tag{28b}$$

Moreover, the minimum value must satisfy $$c_i'(d_i) = v_i + \lambda_i \text{ and } \frac{\hat{d}_i}{D_i} = v_i, \quad \forall i \in \mathcal{N}. \tag{29}$$

Using (28) and (29) dual function can be computed $$D(\sigma) = \begin{cases} \Phi(\sigma) & \sigma \in \tilde{N} \\ -\infty & \text{otherwise} \end{cases}, \quad (30)$$

where $$\tilde{N} := \{\sigma \in \mathbb{R}^{2|N|+|\mathcal{K}|+2|\mathcal{E}|} : (28a) \text{ and } (28b)\}$$

and the function $\Phi(\sigma)$ is decoupled in $\sigma_i = (v_i, \lambda_i)$, $\sigma_k = (\pi_k)$ and $\sigma_{ij} = (\rho_{ij}^+, \rho_{ij}^-)$. That is, $$\Phi(\sigma) = \sum_{i \in N} \Phi_i(\sigma_i) + \sum_{k \in \mathcal{K}} \Phi_k(\sigma_k) + \sum_{ij \in \mathcal{E}} \Phi_{ij}(\sigma_{ij}) \quad (31)$$

where $\Phi_k(\sigma_k) = -\pi_k \hat{P}_k$, $\Phi_{ij}(\sigma_{ij}) = \rho_{ij}^- \underline{P}_{ij} - \rho_{ij}^+ \overline{P}_{ij}$ and $$\Phi_i(\sigma_i) = c_i(d_i(\sigma_i)) + (v_i + \lambda_i)(P_i^m - d_i(\sigma_i)) - \frac{D_i}{2} v_i^2, \quad (32)$$

with $$d_i(\sigma_i) = c_i'^{-1}(v_i + \lambda_i). \quad (33)$$

The dual problem of the OLC (DOLC) is then given by DOLC:

$$\underset{v,\lambda,\pi,\rho}{\text{maximize}} \quad \sum_{i \in N} \Phi_i(v_i, \lambda_i) + \sum_{k \in \mathcal{K}} \Phi_k(\pi_k) + \sum_{ij \in \mathcal{E}} \Phi_{ij}(\rho_{ij}) \quad (34)$$

$$\text{subject to} \quad (28a) \text{ and } (28b)$$

$$\rho_{ij}^+ \geq 0, \quad \rho_{ij}^- \geq 0, \quad ij \in \mathcal{E}$$

Clearly, DOLC is feasible (e.g. take $\sigma = 0$). Then, Assumption 2 implies dual optimal is attained.

Although $D(\sigma)$ is only finite on $\tilde{N}$, $\Phi_i(\sigma_i)$, $\Phi_k(\sigma_k)$ and $\Phi_{ij}(\sigma_{ij})$ are finite everywhere. Thus sometimes the extended version of the dual function can be used (31) instead of $D(\sigma)$, knowing that $D(\sigma) = \Phi(\sigma)$ for $\sigma \in \tilde{N}$. Given any $S \subset \mathcal{N}$, $K \subset \mathcal{K}$ or $U \subset \varepsilon$, define $$\Phi_S(\sigma_S) := \sum_{i \in S} \Phi_i(\sigma_i), \quad \Phi_K(\sigma_K) := \sum_{k \in K} \Phi_k(\sigma_k)$$

$$\text{and } \Phi_U(\sigma_U) = \sum_{ij \in U} \Phi_{ij}(\sigma_{ij})$$

such that $\Phi(\sigma) = \Phi_{\mathcal{N}}(\sigma_{\mathcal{N}}) + \Phi_{\mathcal{K}}(\sigma_{\mathcal{K}}) + \Phi_\varepsilon(\sigma_\varepsilon)$.

The optimization problem has the following property: Given a connected graph $G(\mathcal{N}, \varepsilon)$, then there exists a scalar $v^*$ such that $(d^*, \hat{d}^*, x^*, \sigma^*)$ is a primal-dual optimal solution of OLC and DOLC if and only if $(d^*, \hat{d}^*, x^*)$ is primal feasible (satisfies (25b)-(25e)), $\sigma^*$ is dual feasible (satisfies (28) and (34)), $$\hat{d}_i^* = D_i v_p^* d_i^* = c_i'^{-1}(v_i^* + \lambda_i^*), v_i^* = v^*, i \in \mathcal{N}, \quad (35)$$

and $$\rho_{ij}^{+*}(B_{ij}(v_i^* - v_j^*) - \overline{P}_{ij}) = 0, ij \in \varepsilon, \quad (36a)$$

$$\rho_{ij}^{-*}(\underline{P}_{ij} - B_{ij}(v_i^* - v_j^*)) = 0, ij \in \varepsilon, \quad (36b)$$

Moreover, $d^*$, $\hat{d}^*$, $v^*$ and $\lambda^*$ are unique with $v^* = 0$.

Distributed Optimal Load Control

In several embodiments, power network dynamics can be leveraged to solve the OLC problem in a distributed way. In many embodiments, the solution is based on the classical primal dual optimization algorithm that has been of great use to design congestion control mechanisms in communication networks.

Let $$L(x, \sigma) = \underset{d, \hat{d}}{\text{minimize}} \, L(d, \hat{d}, x, \sigma) \quad (37)$$

$$= L(d(\sigma), \hat{d}(\sigma), x, \sigma)$$

$$= \Phi(\sigma) - P^T C^T v -$$

$$v^T (L_B \lambda - CD_B \hat{C}^T \pi - CD_B(\rho^+ - \rho^-))$$

where $L(d, \hat{d}, x, \sigma)$ is defined as in (27), $d(\sigma) := (d_i(\sigma_i))$ and $\hat{d}(\sigma) := (\hat{d}_i(\sigma_i))$ according to (35).

The following partial primal-dual law can be proposed $$\dot{v}_\mathcal{G} = \zeta_\mathcal{G}^v (P_\mathcal{G}^m - (d_\mathcal{G}(\sigma_\mathcal{G}) + D_\mathcal{G} v_\mathcal{G}) - C_\mathcal{G} P) \quad (38a)$$

$$0 = P_\mathcal{L}^m - (d_\mathcal{L}(\sigma_\mathcal{L}) + D_\mathcal{L} v_\mathcal{L}) - C_\mathcal{L} P \quad (38b)$$

$$\dot{\lambda} = \zeta^\lambda (P^m - d(\sigma) - L_B v) \quad (38c)$$

$$\dot{\pi} = \zeta^\pi (\hat{C} D_B C^T v - \hat{P}) \quad (38d)$$

$$\dot{\rho}^+ = \zeta^{\rho^+} [D_B C^T v - \overline{P}]_{\rho^+}^+ \quad (38e)$$

$$\dot{\rho}^- = \zeta^{\rho^-} [\underline{P} - D_B C^T v]_{\rho^-}^+ \quad (38f)$$

$$\dot{P} = \chi^P (C^T v) \quad (38g)$$

$$\dot{v} = \chi^v (L_B \lambda - CD_B \hat{C}^T \pi - CD_B(\rho^+ - \rho^-)) \quad (38h)$$

where $$\zeta_\mathcal{G}^v = \text{diag}(\zeta_i^v)_{i \in \mathcal{G}},$$

$$\zeta^\lambda = \text{diag}(\zeta_i^\lambda)_{i \in \mathcal{N}},$$

$$\zeta^\pi = \text{diag}(\zeta_k^\pi)_{k \in \mathcal{K}},$$

$$\zeta^{\rho^+} = \text{diag}(\zeta_e^{\rho^+})_{e \in \varepsilon},$$

$$\zeta^{\rho^-} = \text{diag}(\zeta_e^{\rho^-})_{e \in \varepsilon},$$

$$\chi^P = \text{diag}(\chi_e^P)_{e \in \varepsilon}$$

and $$\chi^v = \text{diag}(\chi_i^v)_{i \in \mathcal{N}}.$$

The operator $[\bullet]_u^+$ is an element-wise projection that maintains each element of the $u(t)$ within the positive orthant when $\dot{u} = [\bullet]_u^+$, i.e. given any vector a with same dimension as u then $[\alpha]_u^+$ is defined element-wise by $$[a_e]_{u_e}^+ = \begin{cases} a_e & \text{if } a_e > 0 \text{ or } u_e > 0, \\ 0 & \text{otherwise} \end{cases}. \quad (39)$$

One property that can be used later is that given any constant vector $u^* \geq 0$, then $$(u-u^*)^T [a]_u^+ \leq (u-u^*)^T a \qquad (40)$$

since for any pair $(u_e, a_e)$ that makes the projection active, so $u_e=0$ and $a_e<0$ must be by definition and therefore $$(u_e - u^*_e)a_e = -u^*_e a_e \geq 0 = (u_e - u^*_e)^T [a_e]_{u_e}^+.$$

The name of the dynamic law (38) comes from the fact that $$\frac{\partial}{\partial v} L(x, \sigma)^T = P^m - (d(\sigma_i) + Dv) - CP \qquad (41a)$$

$$\frac{\partial}{\partial \lambda} L(x, \sigma)^T = P^m - d(\sigma) - L_B v \qquad (41b)$$

$$\frac{\partial}{\partial \pi} L(x, \sigma)^T = \hat{C}D_B C^T v - \hat{P} \qquad (41c)$$

$$\frac{\partial}{\partial \rho^+} L(x, \sigma)^T = D_B C^T v - \overline{P} \qquad (41d)$$

$$\frac{\partial}{\partial \rho^-} L(x, \sigma)^T = \underline{P} - D_B C^T v \qquad (41e)$$

$$\frac{\partial}{\partial P} L(x, \sigma)^T = -(C^T v) \qquad (41f)$$

$$\frac{\partial}{\partial v} L(x, \sigma)^T = -(L_B \lambda - CD_B \hat{C}^T \pi - CD_B(\rho^+ - \rho^-)) \qquad (41g)$$

Equations (38a), (38b) and (38g) show that dynamics (17) can be interpreted as a subset of the primal-dual dynamics described in (38) for the special case when $\zeta_i^v = M_i^{-1}$ and $\chi_{ij}^P = B_{ij}$. Therefore, the frequency $\omega_i$ can be interpreted as the Lagrange multiplier $v_i$.

Optimal Load Control Processes

Figure 9:
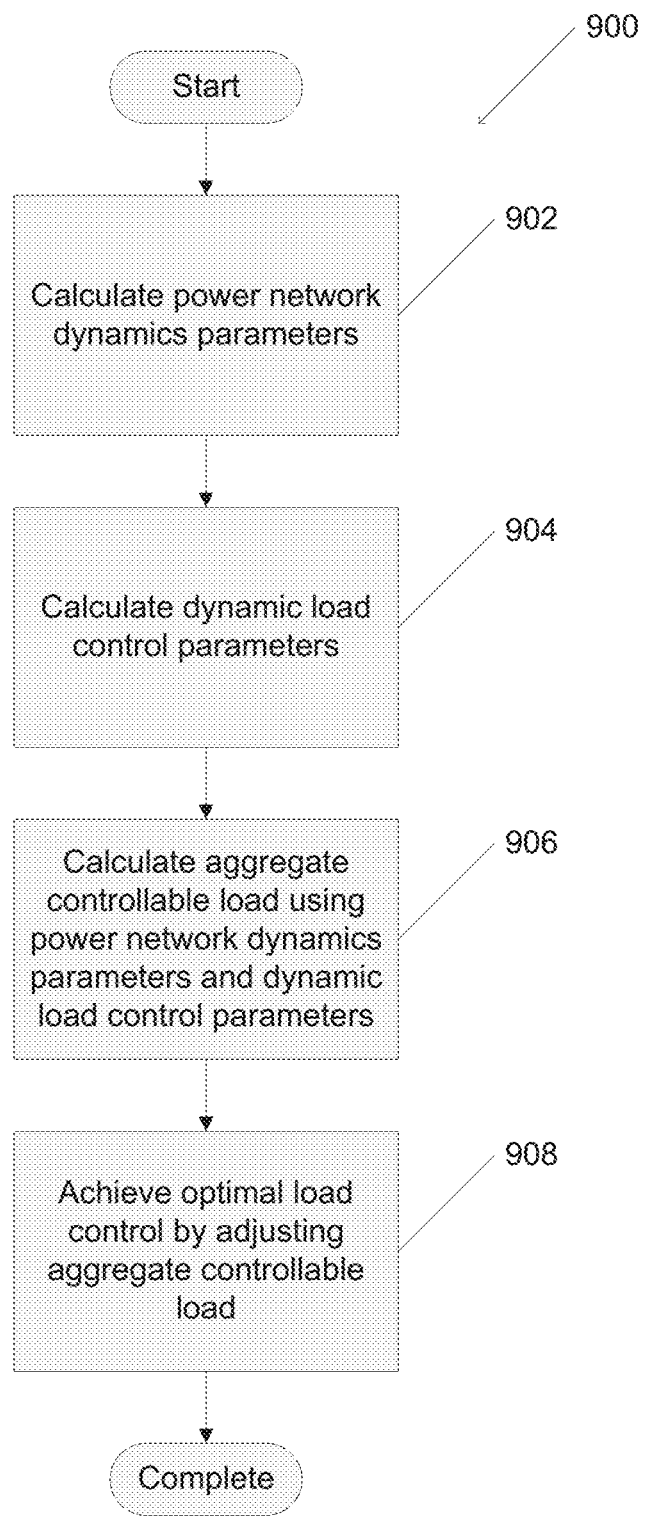
FIG. 9 is a flow chart illustrating a process to solve for optimal load control in a power distribution network in accordance with an embodiment of the invention.

An overview of a process for calculating optimal load control is illustrated in FIG. 9.

Process 900 includes calculating 902 power network dynamics parameters. Power network dynamics parameters will be discussed in greater detail below but can include (but are not limited to) frequency, line flows, and/or change in load consumption. Dynamic load control parameters are calculated 904. Dynamic load control parameters are also discussed in greater detail below and can include (but are not limited to) Lagrange multipliers, and/or load consumption. It can readily be appreciated that primal network dynamics parameters and dynamic load control parameters can be a result of using a primal-dual law as described above. Aggregate controllable load can be calculated 906 using power network dynamics parameters and dynamic load control parameters. Optimal load control can be achieved 908 by adjusting the aggregate controllable load. In many embodiments, this process can occur in a distributed manner. Although a number of processes are discussed above with respect to FIG. 9, any of a variety of different processes for controlling nodes for achieving optimal load control as appropriate to the requirements of specific applications in accordance with many embodiments of the system. Processes for adjusting aggregate controllable load in accordance with various embodiments of the invention are discussed further below.

Figure 10:
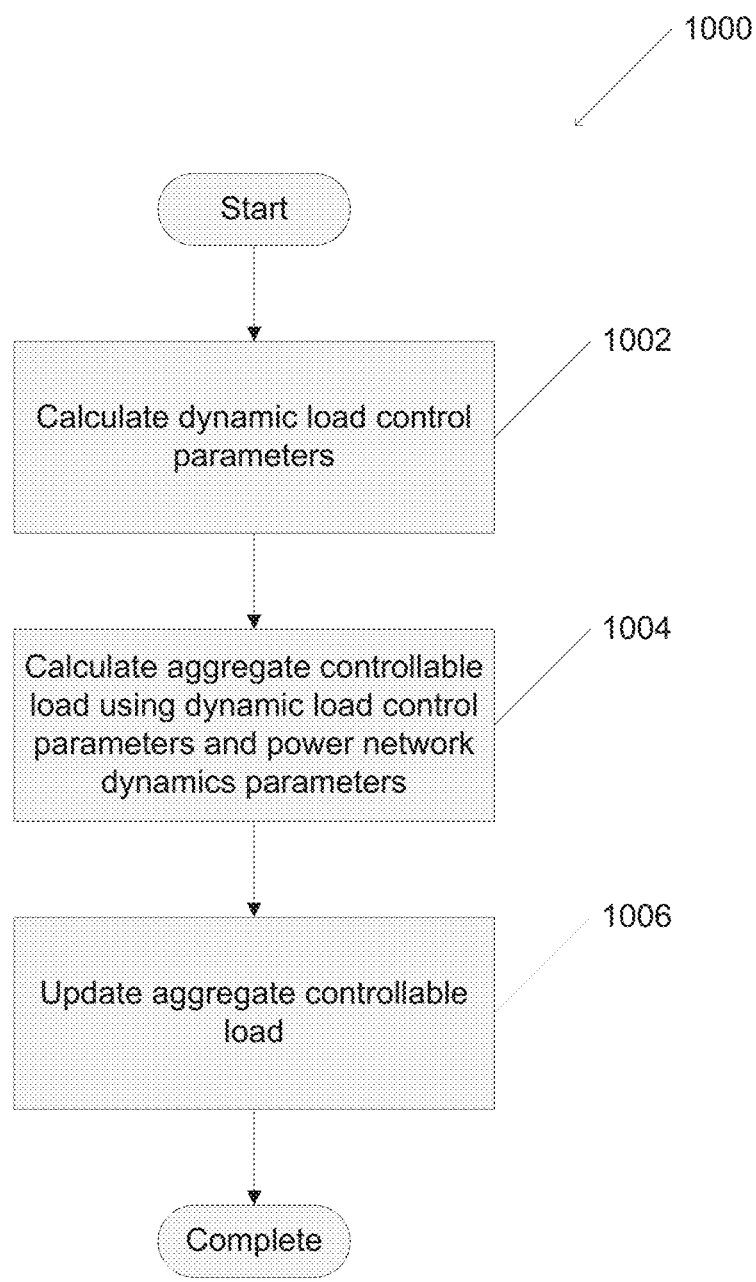
FIG. 10 is a flow chart illustrating a process to adjust an aggregate controllable load in accordance with an embodiment of the invention.

A process for a node to adjust an aggregate controllable load is illustrated in FIG. 10. Referring back to FIG. 8 and FIG. 9, the process can be similar to parts of process 900 and performed by node controllers similar to node controller 800. Process 1000 can include calculating 1002 dynamic load control parameters. Dynamic load control parameters are discussed in greater detail below and can include (but are not limited to) Lagrange multipliers, and/or load consumption. Aggregate controllable load is calculated 1004 using dynamic load control parameters and known power network dynamics parameters. In many embodiments, a shared static feedback loop can be used for parameters that must be calculated by both dynamic load control parameters and power network dynamics parameters. A shared static feedback loop is discussed further below. In many other embodiments, approximations can be made to simplify calculations of dynamic load control parameters, which may eliminate the need for a shared static feedback loop and generate a more distributed process. The aggregate controllable load is updated 1006 based on these calculations. Updating this load drives the network towards optimal load control. Although a number of processes are discussed above with respect to FIG. 10, any of a variety of different processes for achieving distributed optimal load control as appropriate to the requirements of specific applications in accordance with various embodiments of the system.

A distributed load control scheme can be proposed that is naturally decomposed into Power Network Dynamics:

$$\dot{\omega}_G = M_G^{-1}\left(P_G^m - (d_G + \hat{d}_G) - C_G P\right) \qquad (42a)$$

$$0 = P_L^m - (d_L + \hat{d}_L) - C_L P \qquad (42b)$$

$$\dot{P} = D_B C^T \omega \qquad (42c)$$

$$\hat{d} = D\omega \qquad (42d)$$

and
Dynamic Load Control:

$$\dot{\lambda} = \zeta^\lambda (P^m - d - L_B v) \qquad (43a)$$

$$\dot{\pi} = \zeta^\pi (\hat{C} D_B C^T v - \hat{P}) \qquad (43b)$$

$$\dot{\rho}^+ = \zeta^{\pi^+} [D_B C^T v - \overline{P}]_{\pi^+}^+ \qquad (43c)$$

$$\dot{\rho}^- = \zeta^{\pi^-} [\underline{P} - D_B C^T v]_{\rho^-}^+ \qquad (43d)$$

$$\dot{v} = \chi^v (L_B \lambda - C D_B \hat{C}^T \pi - C D_B (\rho^+ - \rho^-)) \qquad (43e)$$

$$d = c'^{-1}(\omega + \lambda) \qquad (43f)$$

Equations (42) and (43) show how the network dynamics can be complemented with dynamic load control such that the whole system amounts to a distributed primal-dual algorithm that tries to find a saddle point on $L(x, \sigma)$. It will be shown below that this system does achieve optimality as intended.

In various embodiments, the control architecture can be derived from the OLC problem. Unlike traditional observer-based controller design architecture, the dynamic load control block does not try to estimate state of the network. Instead, it drives the network towards the desired state using a shared static feedback loop, i.e. $d_i(\lambda_i + \omega_i)$.

Remark 3. One of the limitations of (43) is that in order to generate the Lagrange multipliers $\lambda_i$, $P_i^m - d_i$ must be estimated which is not easy since $P_i^m$ cannot easily be separated from $P_i^m - D_i \omega_i$ when power injection is measured at a given node (bus) without knowing $D_i$. This will be addressed further in other embodiments below where a modified control scheme that can achieve the same equilibrium without needing to know $D_i$ exactly.

Convergence Under Uncertainty

An important aspect of the implementation of the control law (43). A modified control law can be provided that solves the problem raised in Remark 3 will be described below, i.e. that does not require knowledge of $D_i$. It will be shown that the new control law still converges to the same equilibrium provided the estimation error of $D_i$ is small enough.

An alternative mechanism can be proposed to compute $\lambda_i$. Instead of (43), consider the following control law:

Dynamic Load Control (2):

$$\dot{\lambda} = \zeta^\lambda (M\dot{\omega} + B\omega + CP - L_B v) \quad (44a)$$

$$\dot{\pi} = \zeta^\pi (\hat{C} D_B C^T v - \hat{P}) \quad (44b)$$

$$\dot{\pi}^+ = \zeta^{\rho^+} [D_B C^T v - \tilde{P}]_{\rho^+}^+ \quad (44c)$$

$$\dot{\rho}^- = \zeta^{\rho^-} [\underline{P} - D_B C^T v]_{\rho^-}^+ \quad (44d)$$

$$\dot{v} = \chi^v (L_B \lambda - C D_B \hat{C}^T \pi - C D_B (\rho^+ - \rho^-)) \quad (44e)$$

$$d = c'^{-1}(\omega + \lambda) \quad (44f)$$

where $M = \mathrm{diag}\{M_i\}_{i \in \mathcal{N}}$ with $M_i = 0$ for $i \in \mathcal{L}$, and $B = \mathrm{diag}\{b_i\}_{i \in \mathcal{N}}$ Notice that the only difference between (43) and (44) is that (43a) can be substituted with (44a) where now $M_i$ only needs to be estimated for the generators, which is usually known.

The parameter $b_i$ plays the role of $D_i$. In fact, whenever $b_i = D_i$ then one can use (42a) and (42b) to show that (44a) is the same as (43a). In other words, if $b_i = D_i + \delta b_i$ and $\delta B = \mathrm{diag}(\delta b_i)_{i \in \mathcal{N}}$, then using (42a) and (42b):

$$\dot{\lambda} = \zeta^\lambda (M\dot{\omega} + B\omega + CP - L_B v) \quad (45)$$
$$= \zeta^\lambda (M\dot{\omega} + D\omega + \delta B\omega + CP - L_B v)$$
$$= \zeta^\lambda (P^m - d - CP + \delta B\omega + CP - L_B v)$$
$$= \zeta^\lambda (P^m - d + \delta B\omega - L_B v).$$

which is equal to (43a) when $\delta b_i = 0$.

Using (45), the system (42) and (44) can be expressed by $$\dot{x} = -X \frac{\partial}{\partial x} L(x, y)^T \quad (46a)$$

$$\dot{y} = Y \left[ \frac{\partial}{\partial y} L(x, y)^T + g(x, y) \right]_\rho^+ \quad (46b)$$

where $$g(x, y) := \begin{bmatrix} 0 \\ \delta B_G v_G \\ \delta B_\mathcal{L} v_\mathcal{L}^*(x, y) \\ 0 \\ 0 \end{bmatrix} \begin{bmatrix} v_G \\ \lambda_G \\ \lambda_\mathcal{L} \\ \pi \\ \rho \end{bmatrix} \quad (47)$$

with matrix $\delta B_S := \mathrm{diag}(\delta b_i)_{i \in S}$.

In many embodiments, under certain conditions on $b_i$ it can be proven that convergence to the optimal solution is preserved despite the fact that (42) with (44) is no longer a primal dual algorithm. The basic intuition behind this result is that when one uses $b_i$ instead of $D_i$, the system dynamics are no longer a primal-dual law, yet provided $b_i$ does not distant too much form $D_i$, the convergence properties are preserved.

Simulations of OLC

Figure 11:
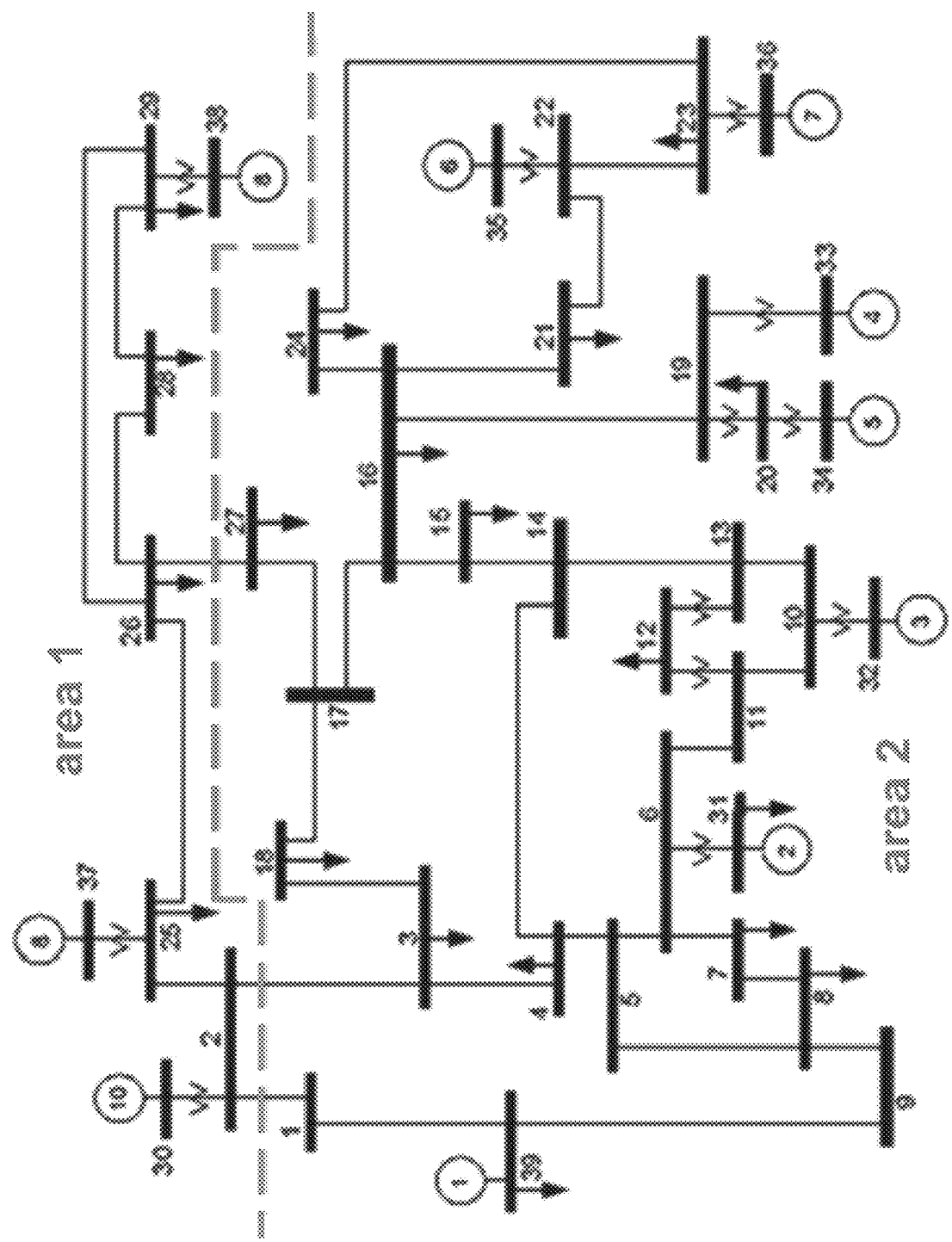
FIG. 11 is a diagram illustrating an IEEE 39 bus system for simulations in accordance with an embodiment of the invention.

Simulations of OLC using the control scheme are illustrated. The IEEE 39 node (bus) system is illustrated in FIG. 11 to simulate the scheme. The simulation assumes that the system has two independent control areas that are connected through lines (1,2), (2,3) and (26,27). The simulated power network parameters as well as the initial stationary point (pre fault state) were obtained from the Power System Toolbox data set.

Each simulated node (bus) is assumed to have a controllable load with $\mathcal{D}_i = [-d_{max}, d_{max}]$, with $d_{max} = 1$ p.u. on a 100 MVA base and disutility function $$c_i(d_i) = \int_0^{d_i} \tan\left(\frac{\pi}{2d_{max}} s\right) ds = -\frac{2d_{max}}{\pi} \ln\left(\left|\cos\left(\frac{\pi}{2d_{max}} d_i\right)\right|\right).$$

Thus, $$d_i(\sigma_i) = c_i'^{-1}(\omega_i + \lambda_i) = \frac{2d_{max}}{\pi} \arctan(\omega_i + \lambda_i).$$

Figure 12A:
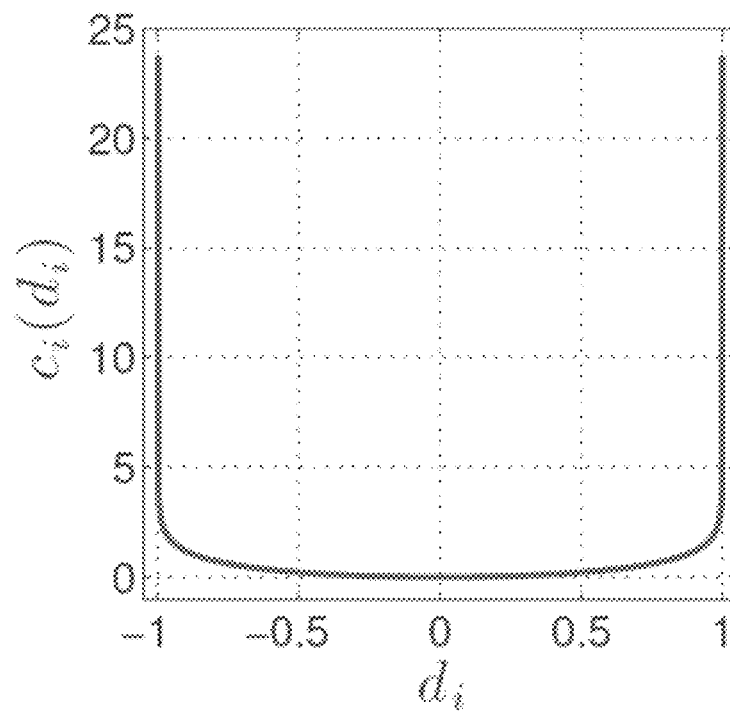
FIGS. 12A-12B are diagrams illustrating a cost or disutility function and an aggregate controllable load respectively in accordance with an embodiment of the invention.
Figure 12B:
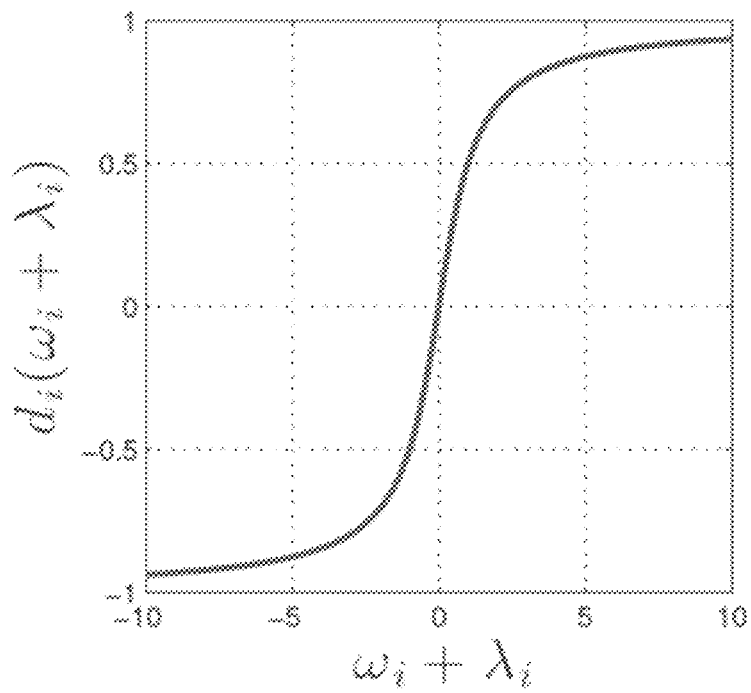

See FIGS. 12A-12B for an illustration of both $c_i(d_i)$ and $d_i(\sigma_i)$.

Throughout the simulations it can be assumed that the aggregate generator damping and load frequency sensitivity parameter $D_i = 0.2$ $\forall i \in \mathcal{N}$ and $\chi_i^v = \zeta_i^\lambda = \zeta_k^\pi = \zeta_e^{\rho^+} = \zeta_e^{\rho^-} = 1$, for all $i \in \mathcal{N}$, $k \in \mathcal{K}$ and $e \in \varepsilon$. These parameter values do not affect convergence, but in general they will affect the convergence rate. The values of $P^m$ are corrected so that they initially add up to zero by evenly distributing the mismatch among the load nodes (buses). $\hat{P}$ is obtained from the starting stationary condition. $\overline{P}$ and $\underline{P}$ can initially be set so that they are not binding.

Figure 13A:
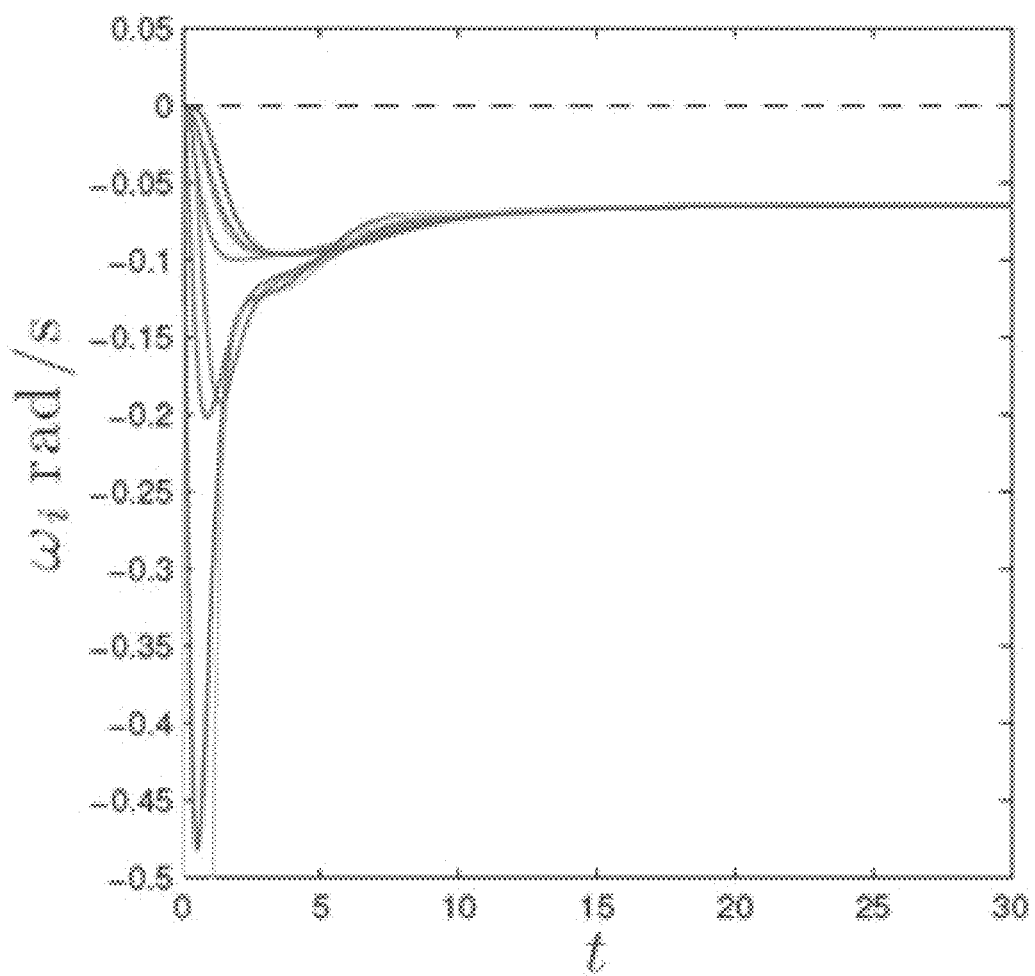
FIGS. 13A-13C are diagrams illustrating the evolution of node frequencies in simulated area 1 in accordance with an embodiment of the invention.
Figure 13B:
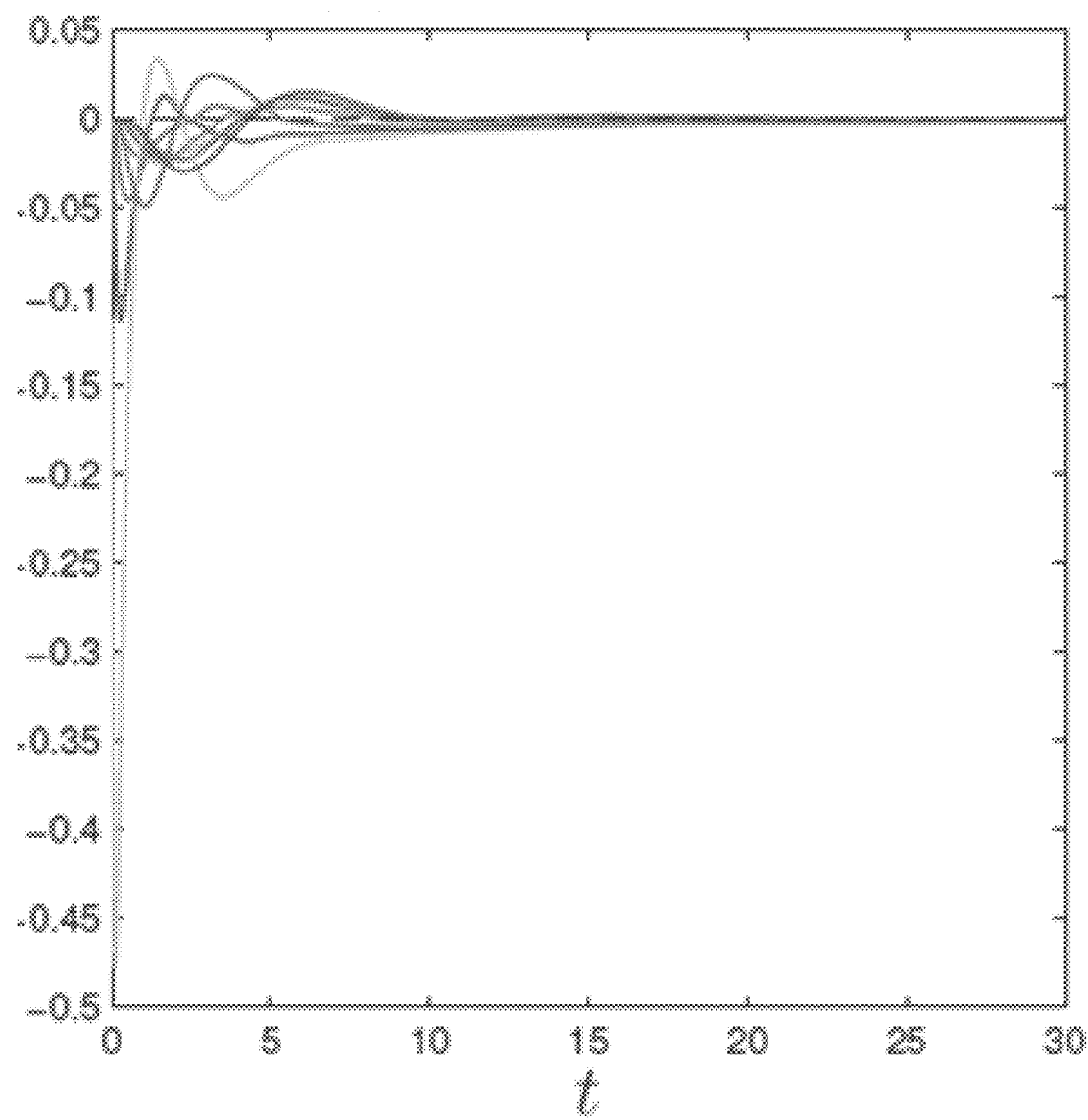
Figure 13C:
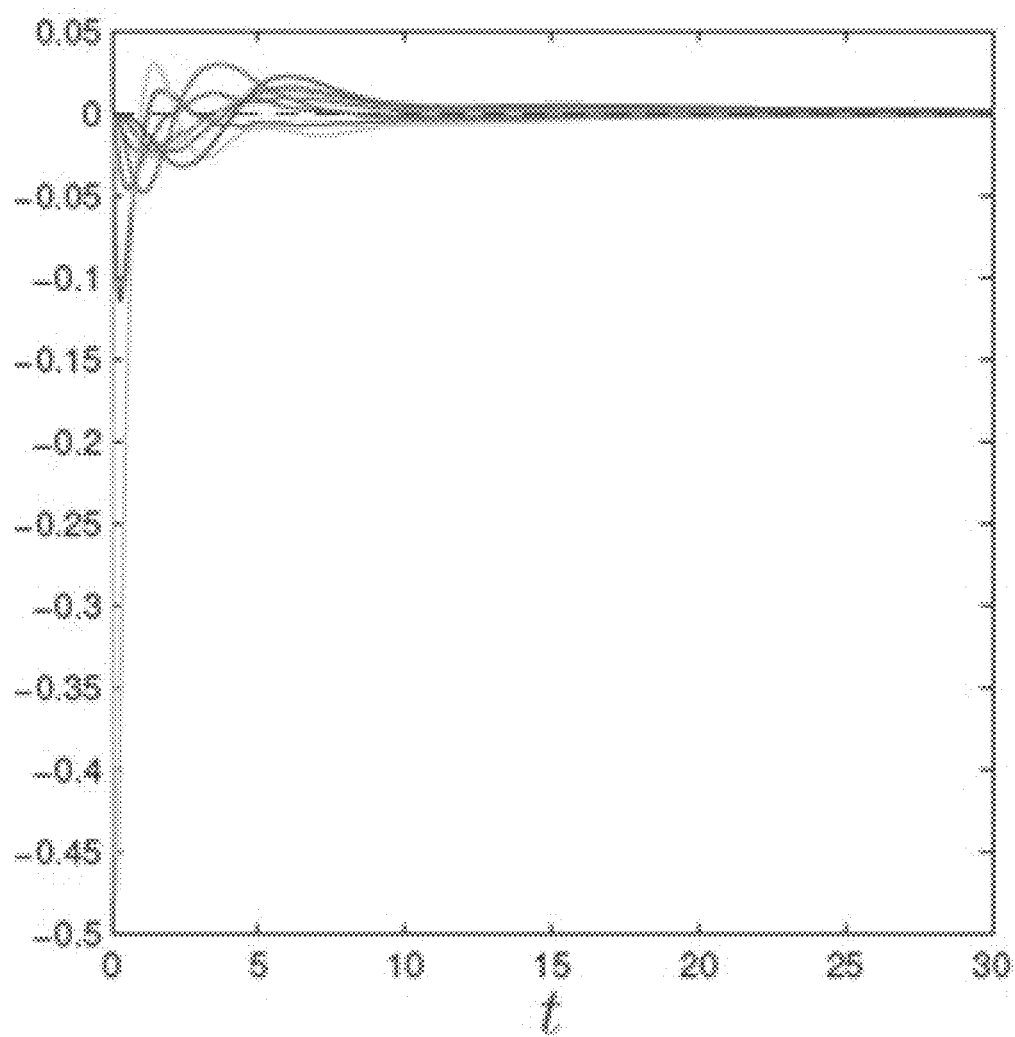
Figure 14A:
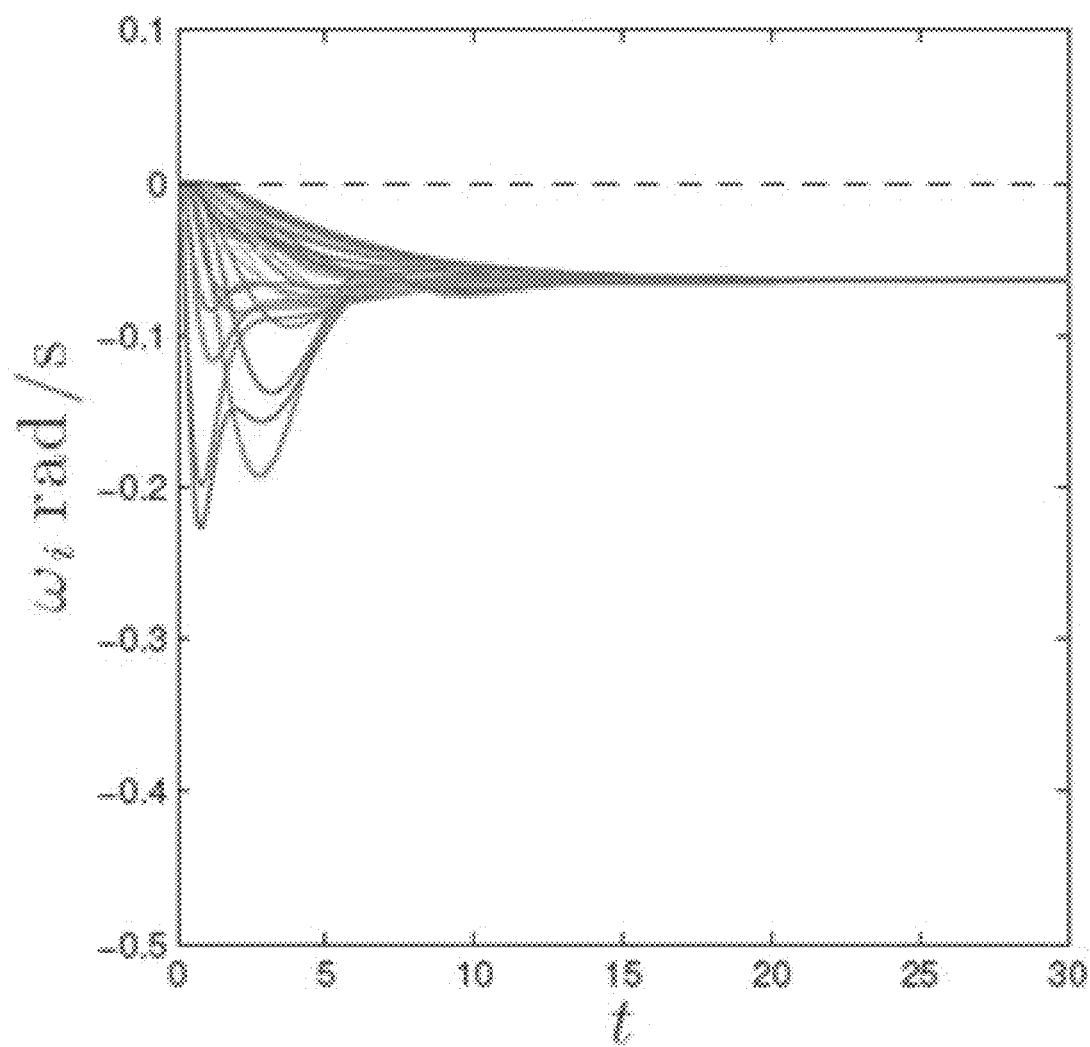
FIGS. 14A-14C are diagrams illustrating the evolution in node frequencies in simulated area 2 in accordance with an embodiment of the invention.
Figure 14B:
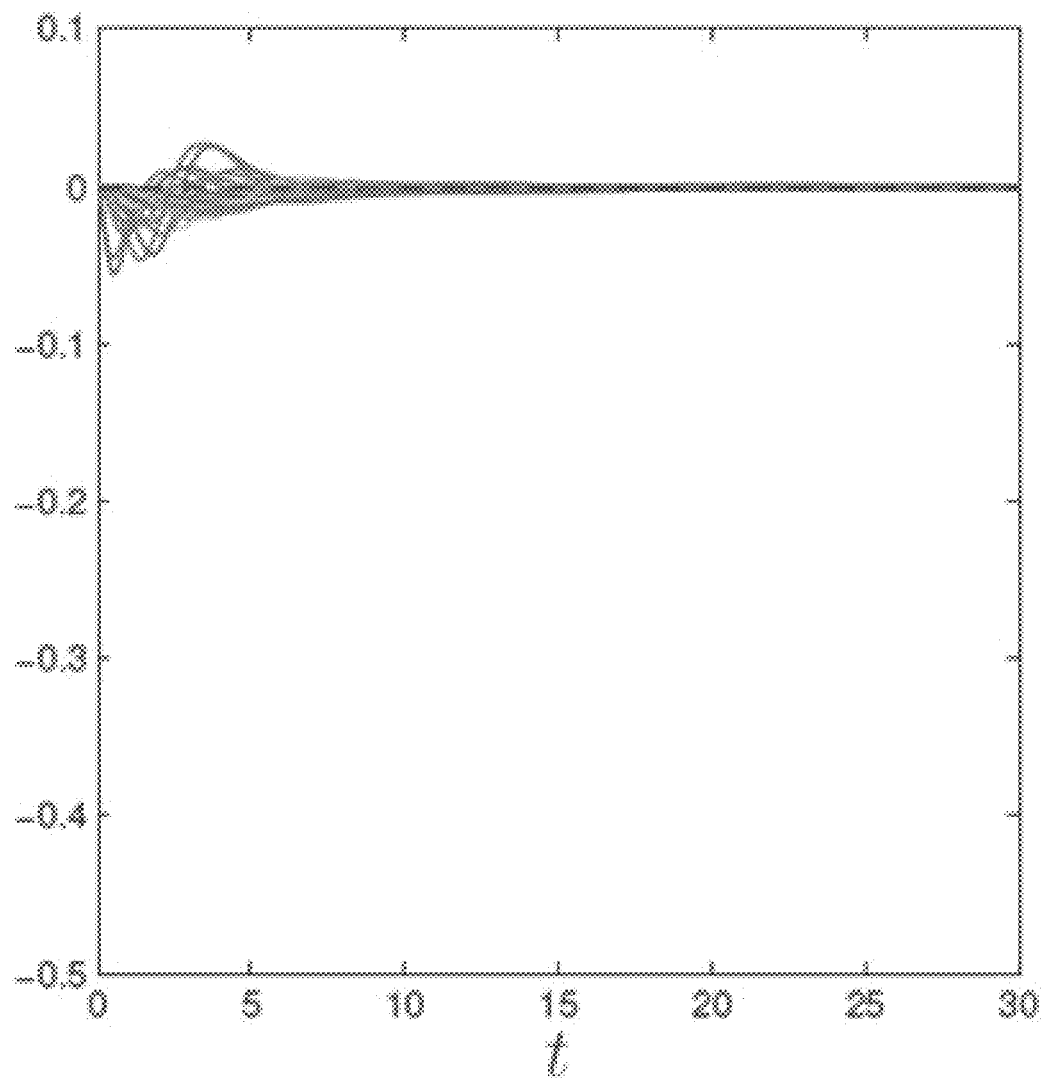
Figure 14C:
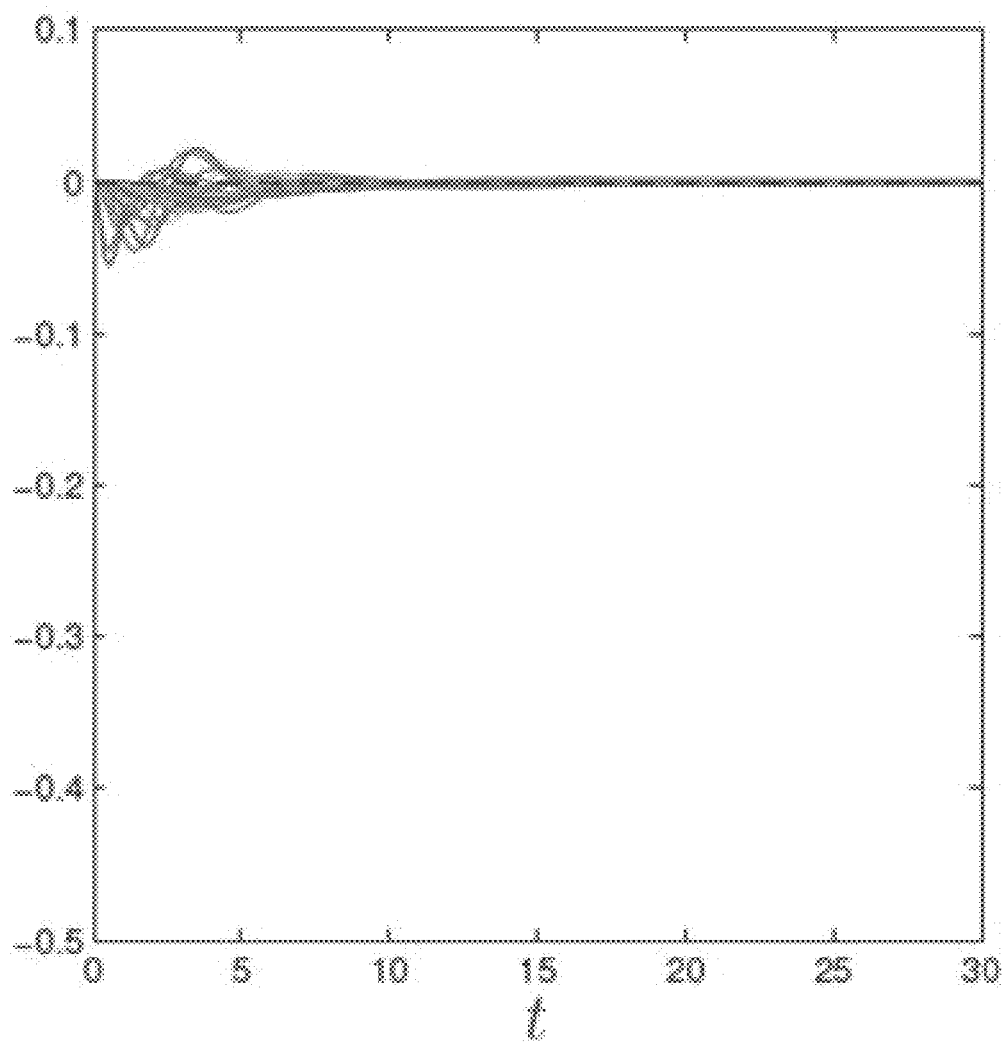

The OLC-system can be simulated as well as the swing dynamics (42) without load control ($d_i = 0$), after introducing a perturbation at node (bus) 29 of $P_{29}^m = -2$ p.u. FIGS. 13A-13C and FIGS. 14A-C illustrate the evolution of the node (bus) frequencies for the uncontrolled swing dynamics (a), the OLC system without inter-area constraints (b), and the OLC with area constraints (c). FIGS. 13A-13C illustrate frequency evolution in area 1. FIGS. 14A-14C illustrate frequency evolution in area 2.

It can be seen that while the swing dynamics alone fail to recover the nominal frequency, the OLC controllers can jointly rebalance the power as well as recovering the nominal frequency. The convergence of OLC seems to be similar or even better than the swing dynamics, as shown in FIGS. 13A-13C and FIGS. 14A-14C.

Figure 15A:
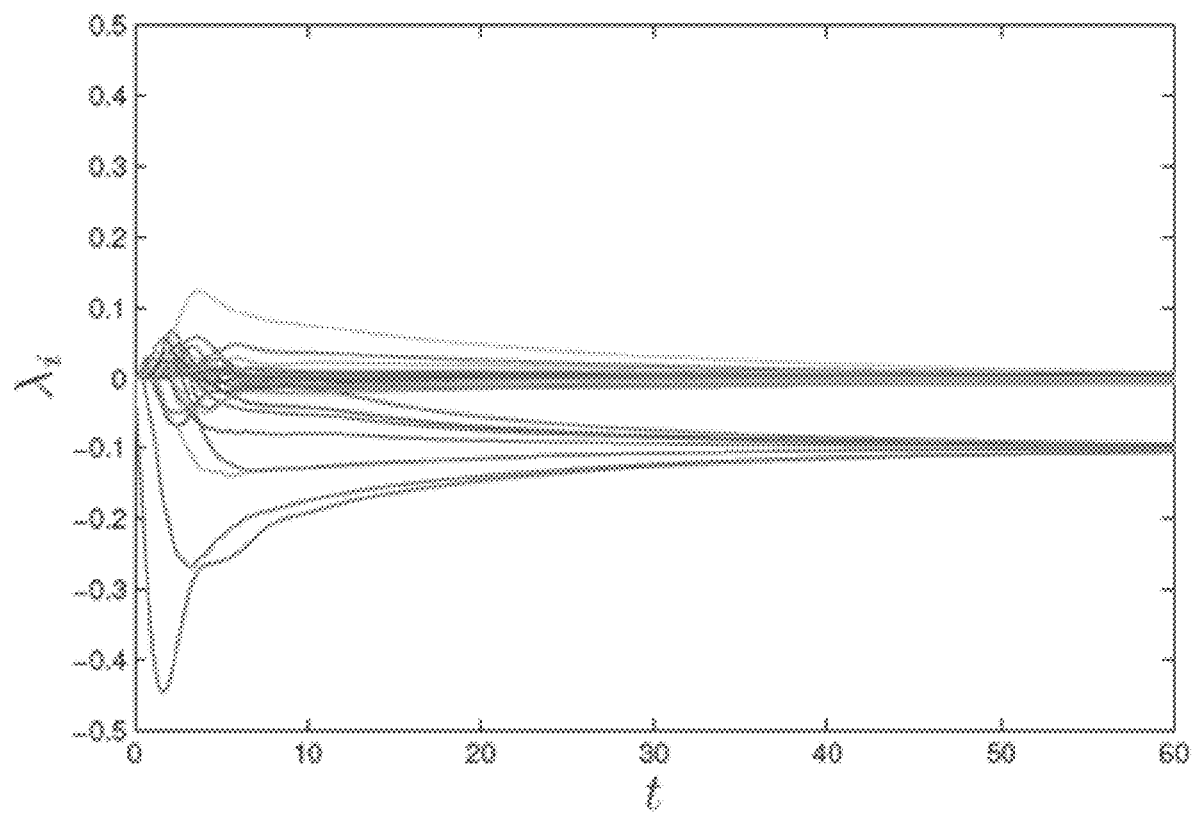
FIGS. 15A-15B are diagrams illustrating LMPs and inter area line flows respectively without thermal limits in optimal load control simulations in accordance with an embodiment of the invention.
Figure 15B:
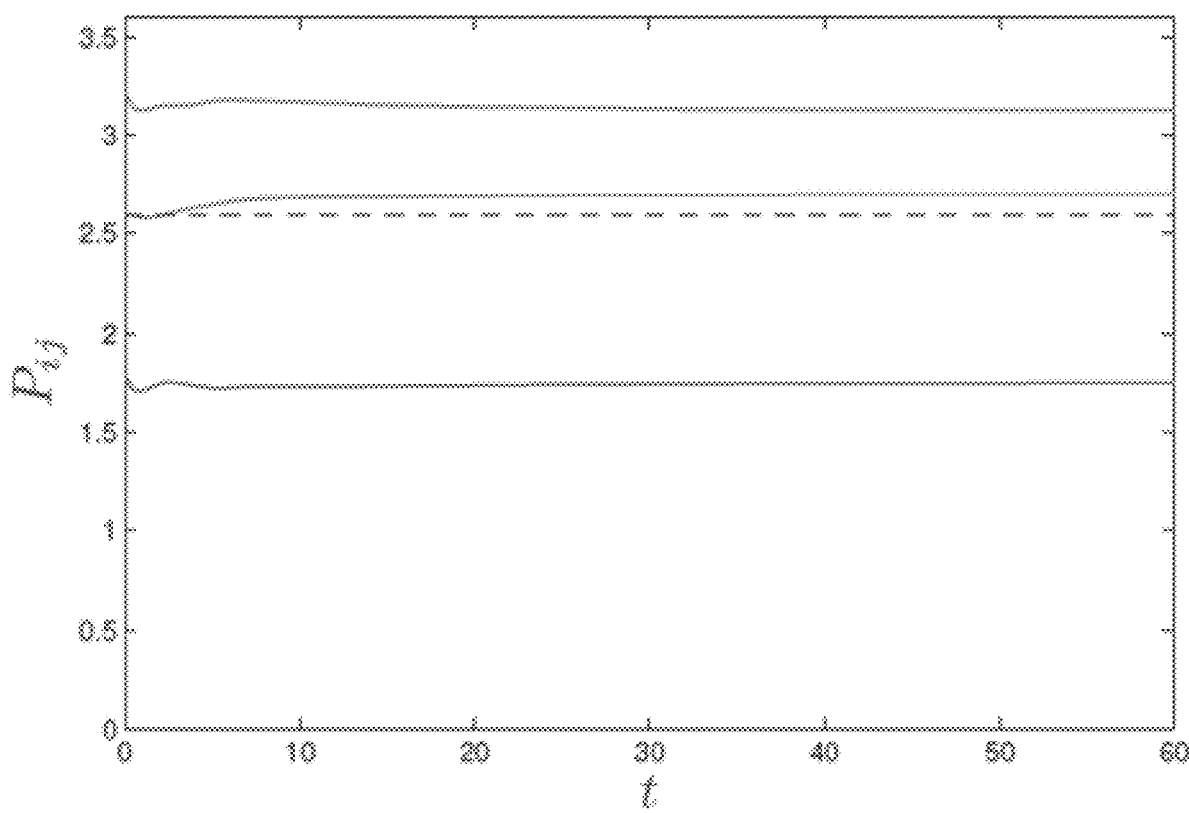
Figure 16A:
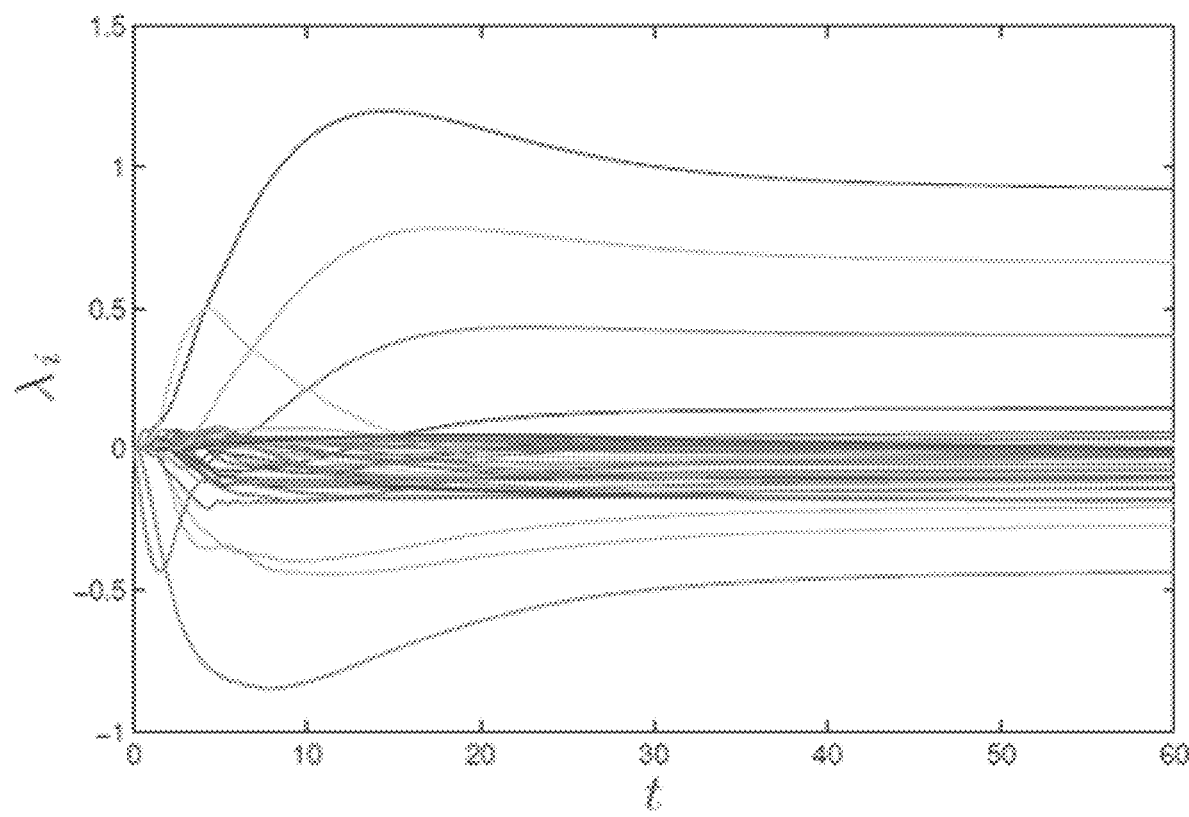
FIGS. 16A-16B are diagrams illustrating LMPs and inter area line flows respectively with thermal limits in optimal load control simulations in accordance with an embodiment of the invention.
Figure 16B:
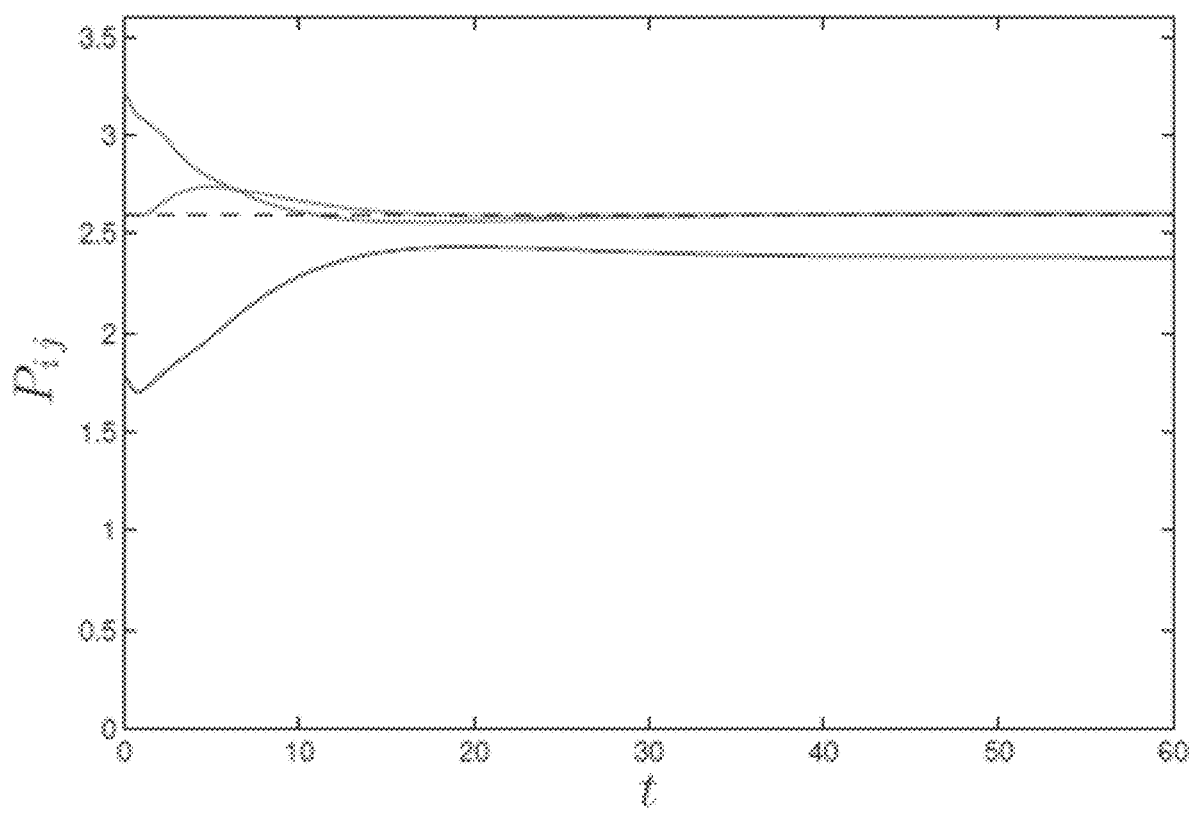
Figure 17B:
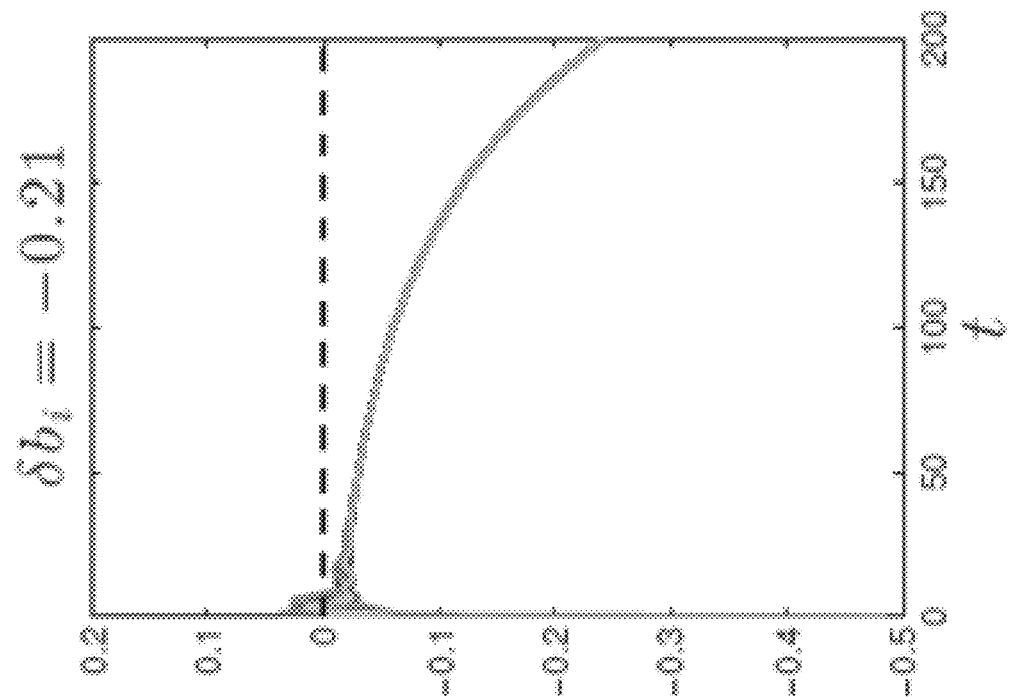
FIGS. 17A-17E are diagrams illustrating node frequency evolution for optimal load control simulations in accordance with an embodiment of the invention.
Figure 17A:
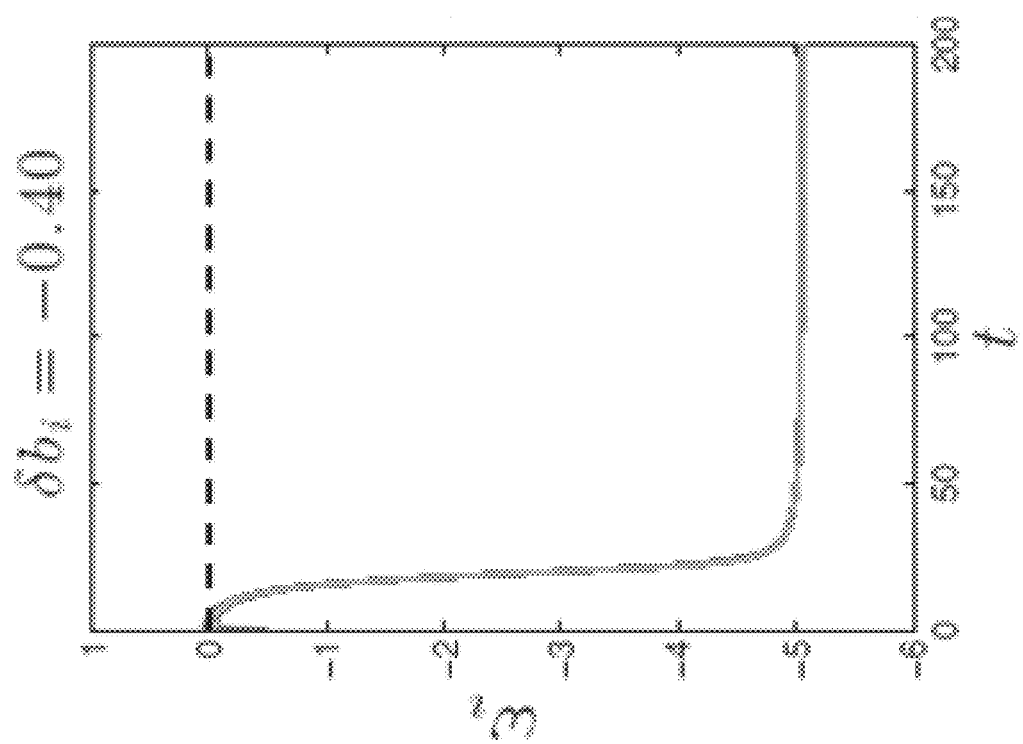
Figure 17D:
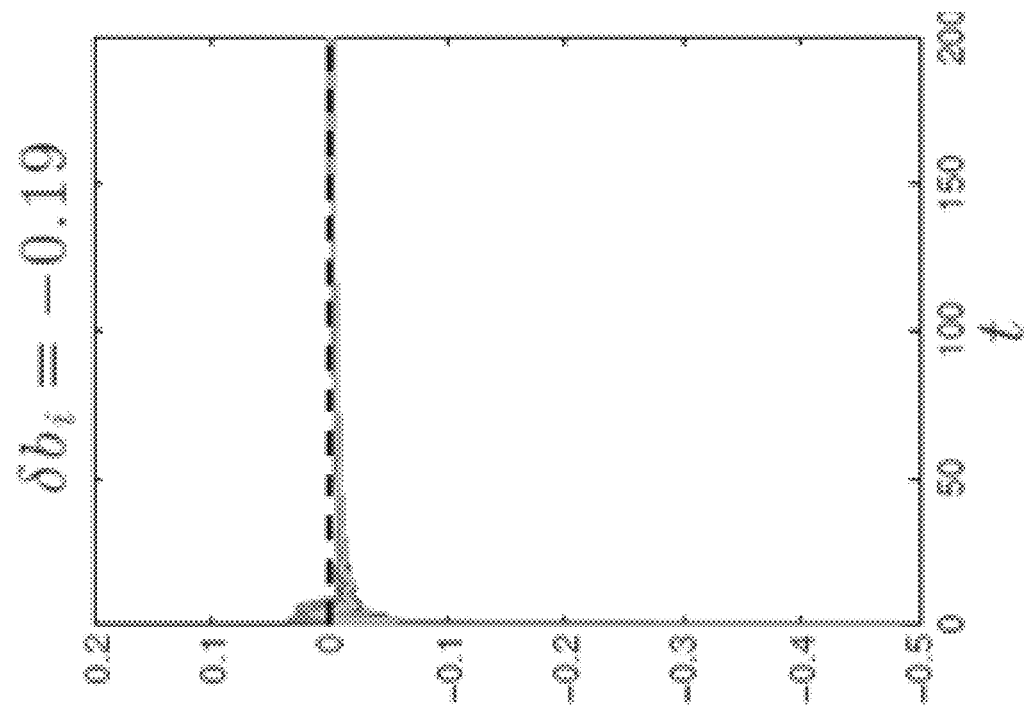
Figure 17C:
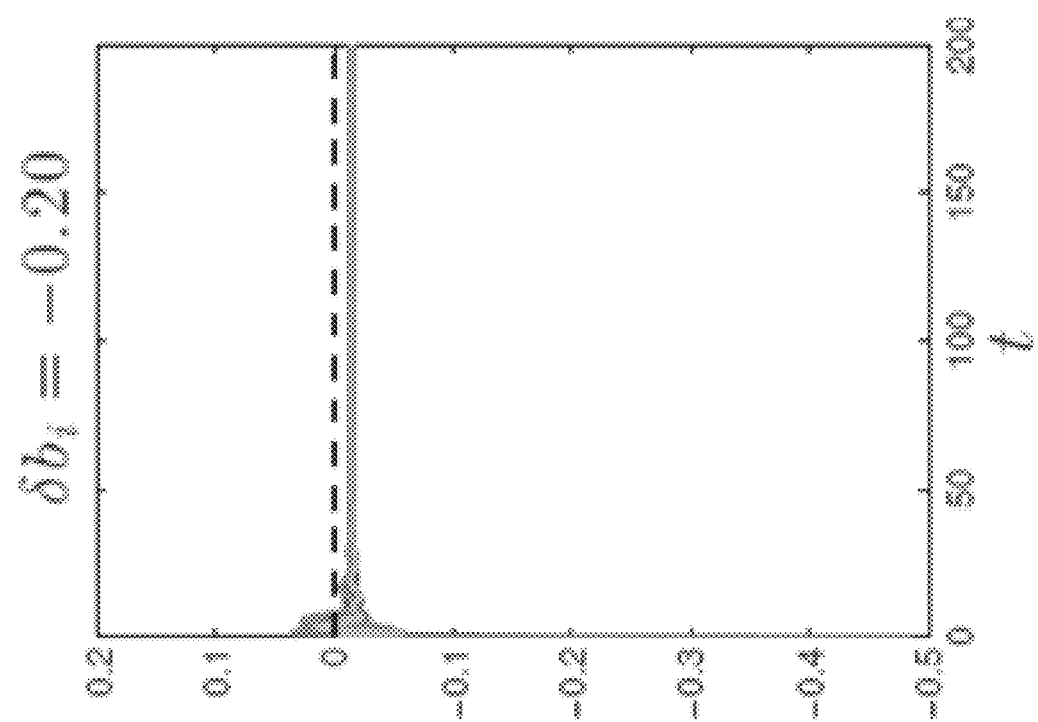
Figure 18A:
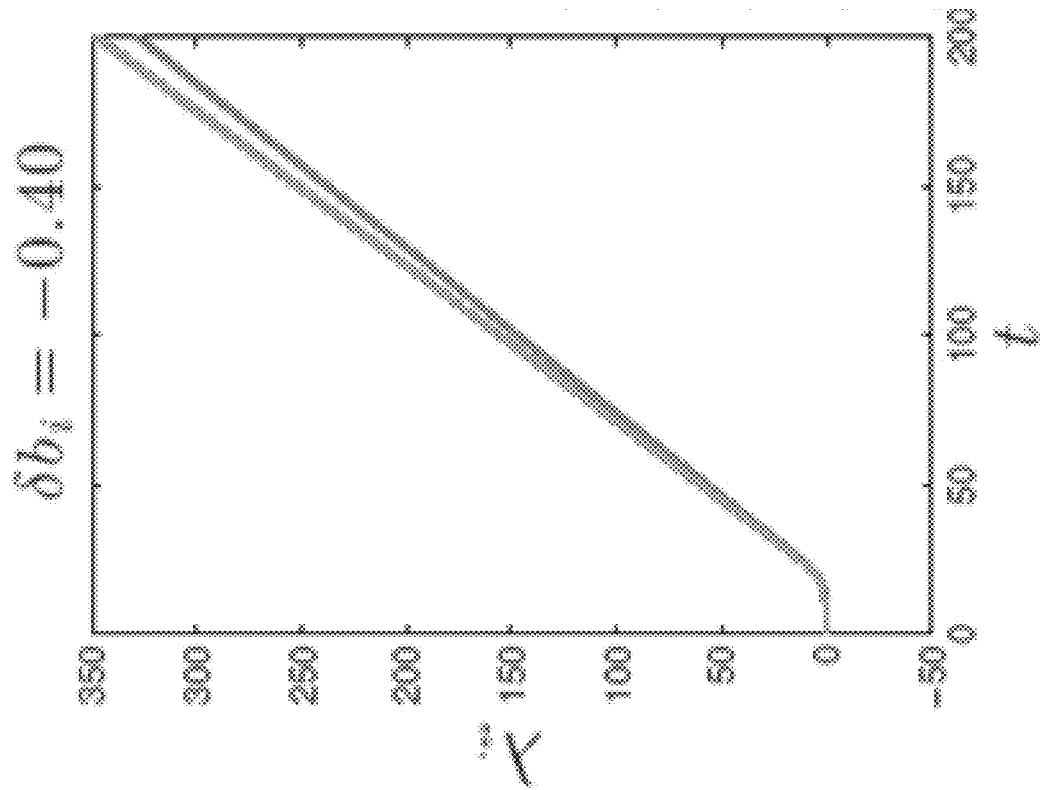
FIGS. 18A-18E are diagrams illustrating location marginal prices evolution for optimal load control simulations in accordance with an embodiment of the invention.
Figure 17E:
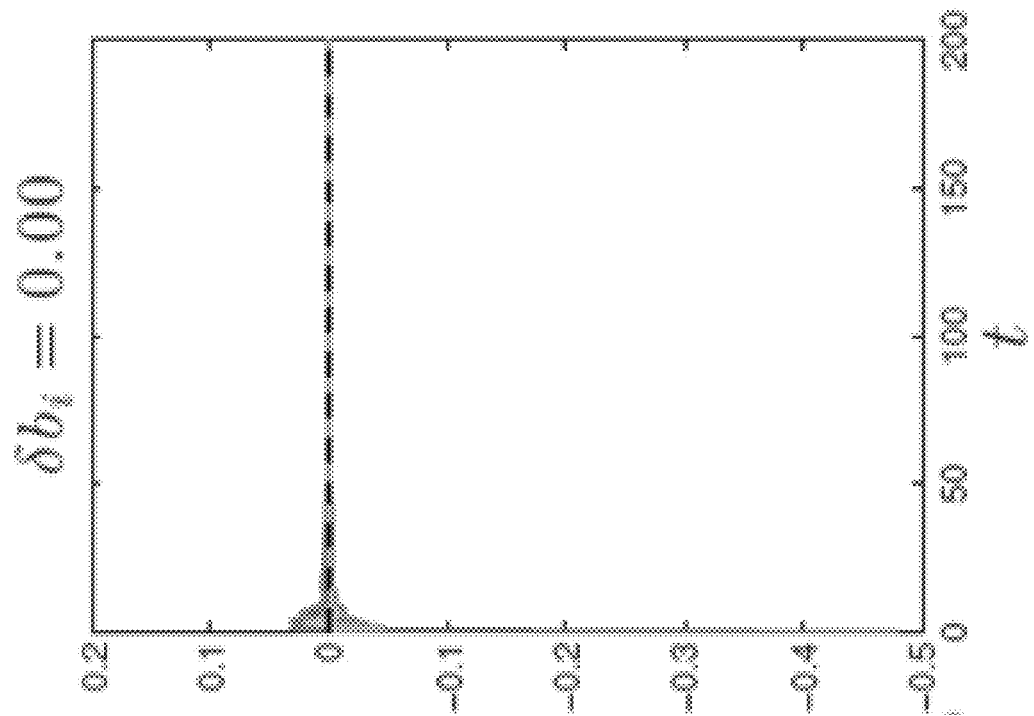
Figure 18C:
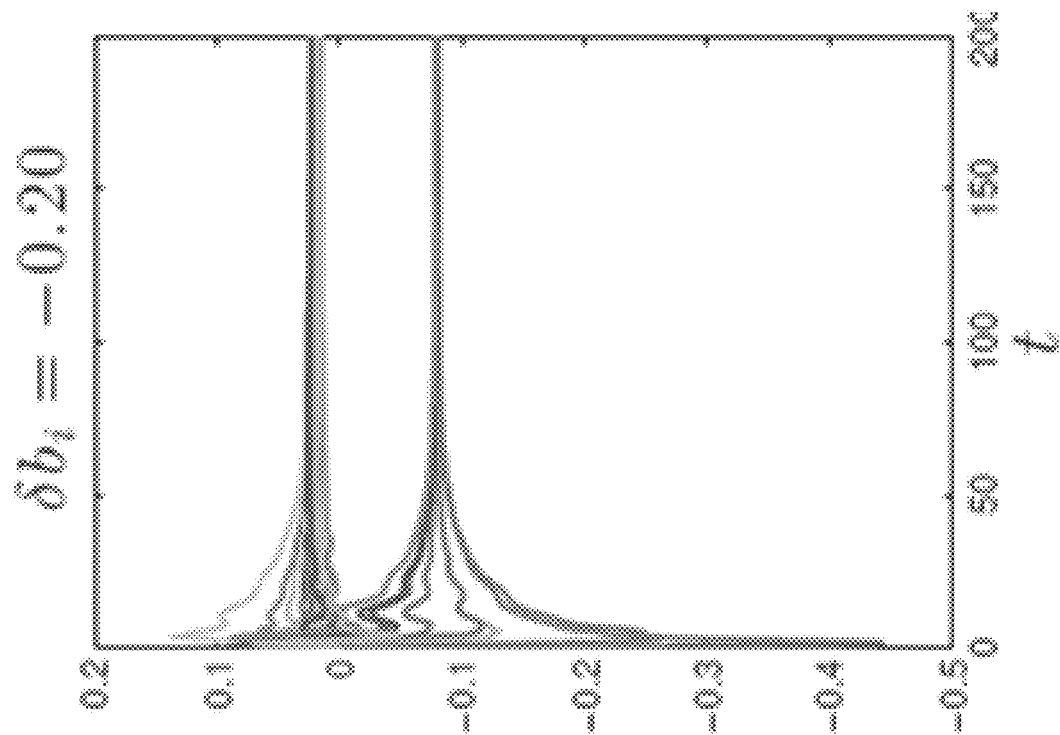
Figure 18B:
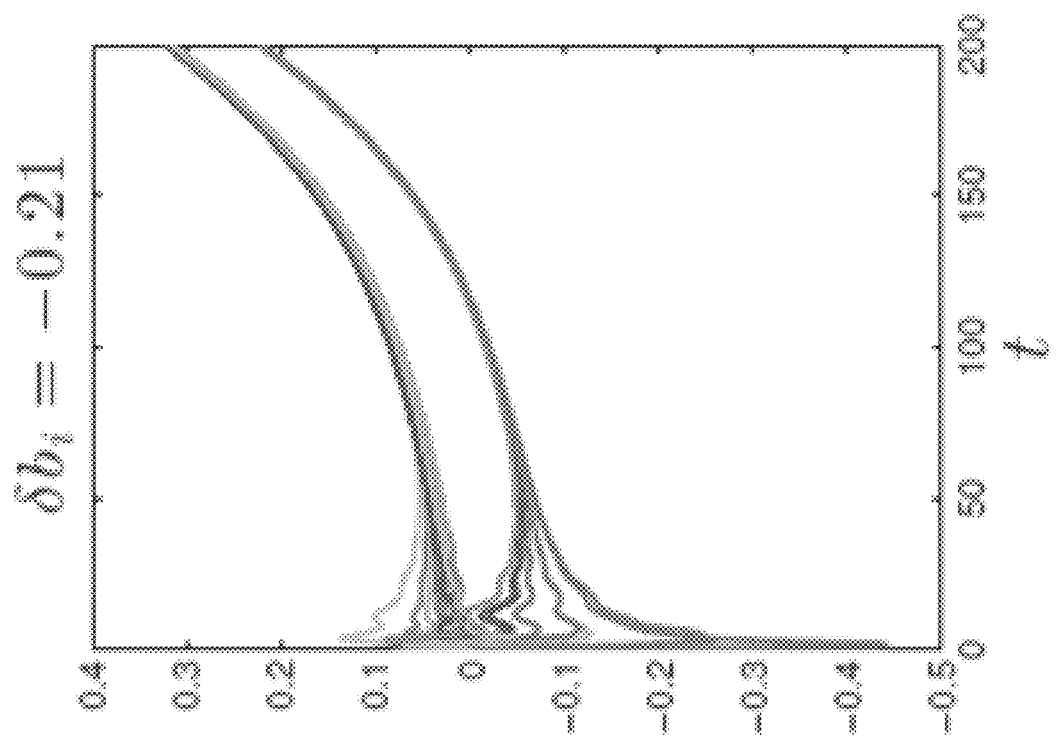
Figure 18E:
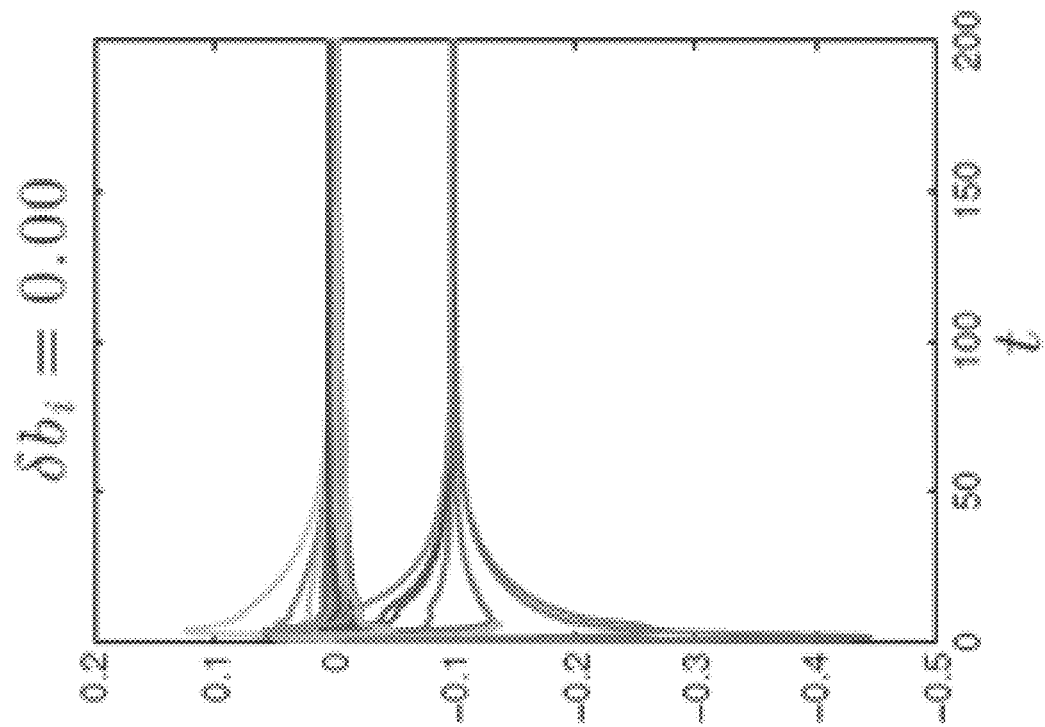
Figure 18D:
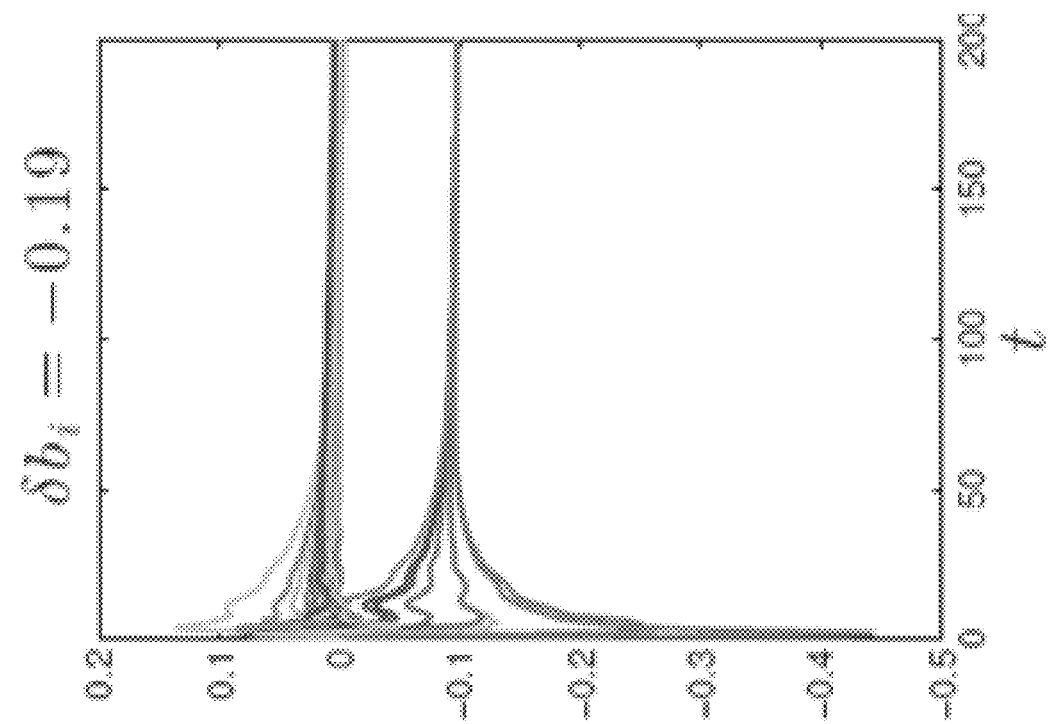

Next, the action of the thermal constraints can be illustrated by adding a constraint of $\overline{P}_e = 2.6$ p.u. and $\underline{P}_e = -2.6$ p.u. to the tie lines between areas. FIGS. 15A-15B show the values of the multipliers $\lambda_i$, that correspond to the Locational Marginal Prices (LMPs), and the line flows of the tie lines for the same scenario displayed in FIGS. 13C and 14C i.e. without thermal limits. It can be seen that neither the initial condition, nor the new steady state can satisfy the thermal limit (shown by a dashed line). However, once thermal limits are added to the OLC scheme, FIGS. 16A-16B show that the system converges to a new operating point that satisfies the constraints.

Finally, the conservativeness of the bound can be shown. Simulate the system (42) and (44) under the same conditions as in FIGS. 15A-15B. $B_i$ can be set such that the corresponding $\delta b_i$s are homogeneous for every node (bus) i.

FIGS. 17A-17E and FIGS. 18A-18E show the evolution of the frequency $\omega_i$ and LMPs $\lambda_i$ for different values of $\delta b_i$ belonging to $\{-0.4, -0.21, -0.2, -0.19, 0.0\}$. Since $D_i=0.2$ at all the nodes (buses), then $\delta b_i=-0.2$ is the threshold that makes $B_i$ go from positive to negative as $\delta b_i$ decreases.

The simulations show that the system converges whenever $B_i \geq 0$ ($\delta b_i \geq -0.2$). The case when $\delta b_i = -0.2$ is of special interest. Here, the system converges, yet the nominal frequency is not restored. This is because the terms $\delta b_i \omega_i$ (45) are equal to the terms $D_i \omega_i$ in (42a)-(42b). Thus $\omega_i$ and $\lambda_i$ can be made simultaneously zero with nonzero $w^*_i$. Fortunately, this can only happen when $B_i=0$ which can be avoided since $B_i$ is a designed parameter.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A node controller comprising:
   a network interface;
   a processor; and
   a memory containing:
   a frequency control application; and
   a plurality of node operating parameters describing the operating parameters of a node, where the node is a generator node selected from a group consisting of at least one generator node in a power distribution network;
   wherein the processor is configured by the frequency control application to:
   calculate a plurality of updated node operating parameters using a distributed process to determine the updated node operating parameters using the node operating parameters,
   wherein the updated node operating parameters are determined based o frequency data measured at the node and independently of frequency data calculated based on data from at least another node within the power distribution network,
   wherein at least one of the updated node operating parameters are further determined based on a function of both a cost function and of frequency deviations of the node from a nominal frequency that is measured locally at the node,
   wherein a feedback control is designed based on the local measurements of frequency deviations and a set of parameters that specify the bounds of control parameters,
   where the distributed process controls network frequency subject to a real power injection to the node in the power distribution network; and
   adjust the node operating parameters to change the network frequency by controlling the frequency of the node based on the adjusted node operating parameters.

2. The node controller of claim 1, wherein the node operating parameters include a node frequency.

3. The node controller of claim 1, wherein the node operating parameters include generator node parameters.

4. The node controller of claim 1, wherein the node operating parameters include a bounded control variable.

5. The node controller of claim 1, wherein to calculate a plurality of updated node operating parameters using a distributed process processor using the following expression:

$$p_j^c(\omega_j) = [(c_j')^{-1}(-\omega_j)]_{\underline{p}_j}^{\overline{p}_j} \quad j \in \mathcal{G}$$

where $p^c$ is a frequency control parameter, $\omega$ is a frequency, c is a cost or disutility function, $\underline{p}_j$ and $\overline{p}_j$ are bounds on the frequency control parameter, j is the node, and $\mathcal{G}$ is the at least one generator node.

6. A node controller comprising:
   a network interface;
   a processor; and
   a memory containing:
   a frequency control application; and
   a plurality of node operating parameters describing the operating parameters of a node, where the node is a load node selected from a group consisting of at least one load node in a power distribution network;
   wherein the processor is configured by the frequency control application to:
   calculate a plurality of updated node operating parameters using a distributed process to determine the updated node operating parameters using the node operating parameters, wherein the updated node operating parameters are determined based on frequency data measured at the node and independently of frequency data calculated based on data from at least another node within the power distribution network, wherein at least one of the updated node operating parameters are further determined based on a function of both a cost function and of frequency deviations of the node from a nominal frequency that is measured locally at the node, wherein a feedback control is designed based on the local measurements of frequency deviations and a set of parameters that specify the bounds of control parameters, where the distributed process controls network frequency subject to a real power injection to the node in the power distribution network; and
   adjust the node operating parameters to change the network frequency by controlling the frequency of the node based on the adjusted node operating parameters.

7. The node controller of claim 6, wherein the node operating parameters include load node parameters.

8. The node controller of claim 6, wherein the node operating parameters include a bounded control variable.

9. The node controller of claim 6, wherein to calculate a plurality of updated node operating parameters using a distributed process is evaluated by the processor using the following expression:

$$p_j(\omega_j) = [(c_j')^{-1}(-\omega_j)]_{\underline{p}_j}^{\overline{p}_j} \quad j \in \mathcal{L}$$

where p is a frequency control parameter, ω is a frequency, c is a cost or disutility function, $\underline{p}_j$ and $\overline{p}_j$ are bounds on the frequency control parameter, j is the node, and $\mathcal{L}$ is the at least one load node.

10. The node controller of claim 6, wherein adjusting the node operating parameters further comprises constraining the node operating parameters within thermal limits.

11. A power distribution network, comprising:
one or more centralized computing systems;
a communications network;
a plurality of generator node controllers, where each generator node controller in the plurality of generator node controllers contains:
a generator network interface;
a generator node processor; and
a generator memory containing:
a frequency control application; and
a plurality of generator node operating parameters describing the operating parameters of a generator node in a power distribution network;
where the generator node processor is configured by the frequency control application to:
calculate a plurality of updated generator node operating parameters using a distributed process to determine the updated generator node operating parameters using the generator node operating parameters, wherein the updated generator node operating parameters are determined based on frequency data measured at the generator node and independently of frequency data calculated based on data from at least another generator node within the power distribution network, wherein at least one of the updated generator node operating parameters are further determined based on a function of both a cost function and of frequency deviations of the node from a nominal frequency that is measured locally at the generator node, wherein a feedback control of the generator node is designed based on the local measurements of frequency deviations and a set of generator bound parameters that specify the bounds of control parameters, where the distributed process controls network frequency subject to a real power injection to the generator node in the power distribution network; and
adjust the generator node operating parameters to change the network frequency by controlling the frequency of the generator node based on the adjusted generator node operating parameters; and
a plurality of load node controllers, where each load node controller in the plurality of generator node controllers contains:
a load network interface;
a load node processor; and
a load memory containing:
the frequency control application; and
a plurality of load node operating parameters describing the operating parameters of a load node in the power distribution network;
where the load node processor is configured by the frequency control application to:
calculate a plurality of updated load node operating parameters using the distributed process to determine the updated load node operating parameters using the load node operating parameters, wherein the updated load node operating parameters are determined based on frequency data measured at the load node and independently of frequency data calculated based on data from at least another load node within the power distribution network, wherein at least one of the updated load node operating parameters are further determined based on a function of both a cost function and of frequency deviations of the load node from a nominal frequency that is measured locally at the load node, wherein a feedback control of the load node is designed based on the local measurements of frequency deviations and a set of load bound parameters that specify the bounds of control parameters, where the distributed process controls network frequency subject to a real power injection to the load node in the power distribution network; and
adjust the load node operating parameters to change the network frequency by controlling the frequency of the load node based on the adjusted load node operating parameters.

12. The power distribution network of claim 11, wherein the load node operating parameters include a node frequency.

13. The power distribution network of claim 11, wherein the generator node operating parameters include a bounded control variable.

14. The power distribution network of claim 11, wherein the load node operating parameters include a bounded control variable.

15. The power distribution network of claim 11, wherein to calculate a plurality of updated generator node operating parameters using a distributed process is evaluated by the processor using the following expression:

$$p_j^c(\omega_j) = [(c_j')^{-1}(-\omega_j)]_{\underline{p}_j}^{\overline{p}_j} \quad j \in \mathcal{G}$$

where $p^c$ is a frequency control parameter, ω is a frequency, c is a cost or disutility function, $\underline{p}_j$ and $\overline{p}_j$ are bounds on the frequency control parameter, j is the node, and $\mathcal{G}$ is the at least one generator node.

16. The power distribution network of claim 11, wherein to calculate a plurality of updated load node operating parameters using the distributed process is evaluated by the processor using the following expression:

$$p_j(\omega_j) = [(c_j')^{-1}(-\omega_j)]_{\underline{p}_j}^{\overline{p}_j} \quad j \in \mathcal{L}$$

where p is a frequency control parameter, 107 is a frequency, c is a cost or disutility function, $\underline{p}_j$ and $\overline{p}_j$ are bounds on the frequency control parameter, j is the node, and $\mathcal{L}$ is the at least one load node.

17. The node controller of claim 1, wherein the distributed process controls network frequency further subject to a moment of inertia and a damping coefficient.

18. The node controller of claim 6, wherein the distributed process controls network frequency further subject to a coefficient of a linear frequency dependent load.

19. The node controller of claim 6, wherein the node operating parameters include a node frequency.

20. The power distribution network of claim 11, wherein the generator node operating parameters include a node frequency.

21. The power distribution network of claim 11, wherein the distributed process to determine the updated generator node parameter controls network frequency further subject to a moment of inertia and a damping coefficient.

22. The power distribution network of claim 11, wherein the distributed process to determine the updated load node operating parameters controls network frequency further subject to a coefficient of a linear frequency dependent load.

* * * * *